(12) United States Patent
Lohbihler et al.

(10) Patent No.: US 10,452,157 B2
(45) Date of Patent: Oct. 22, 2019

(54) DEVICE AND METHOD FOR ORIENTATION AND POSITIONING

(71) Applicant: XYZ INTERACTIVE TECHNOLOGIES INC., Toronto (CA)

(72) Inventors: Andrew H. Lohbihler, Waterloo (CA); Michael Kosic, Toronto (CA); Valentin M. Burtea, Toronto (CA)

(73) Assignee: XYZ INTERACTIVE TECHNOLOGIES INC. (CA)

( * ) Notice: Subject to any disclaimer, the term of this patent is extended or adjusted under 35 U.S.C. 154(b) by 0 days.

(21) Appl. No.: 15/517,443

(22) PCT Filed: Oct. 6, 2015

(86) PCT No.: PCT/CA2015/051012
§ 371 (c)(1),
(2) Date: Apr. 6, 2017

(87) PCT Pub. No.: WO2016/054736
PCT Pub. Date: Apr. 14, 2016

(65) Prior Publication Data
US 2018/0107288 A1    Apr. 19, 2018

Related U.S. Application Data

(60) Provisional application No. 62/060,769, filed on Oct. 7, 2014.

(51) Int. Cl.
*G01S 1/70* (2006.01)
*G06F 3/03* (2006.01)
(Continued)

(52) U.S. Cl.
CPC .............. *G06F 3/0325* (2013.01); *G01S 1/70* (2013.01); *G01S 3/784* (2013.01); *G01S 5/0247* (2013.01);
(Continued)

(58) Field of Classification Search
CPC .......... G06F 3/0325; G06F 17/18; G01S 1/70; G01S 3/784; G01S 5/0247; G01S 5/16; G01S 5/186; G01S 11/14; G05D 1/028
See application file for complete search history.

(56) References Cited

U.S. PATENT DOCUMENTS 3,704,465 A    11/1972   Masak et al.
3,898,383 A     8/1975   Herbits
(Continued)

FOREIGN PATENT DOCUMENTS

CA    2758017         10/2010
CN   87105803 A        6/1988
(Continued)

OTHER PUBLICATIONS

International Search Report for International Application No. PCT/CA2010/000095 dated Jul. 7, 2010.
(Continued)

*Primary Examiner* — Matthew G Marini
(74) *Attorney, Agent, or Firm* — Katten Muchin Rosenman LLP

(57) ABSTRACT

Methods and devices for, among other applications, locating an emitter, comprises an array of receivers configured in different angular positions about the array relative to a corresponding array location axis, to receive a signal from the emitter having at least one burst containing a train of pulses, and at least one processor configured to profile pulse count values at each receiver, from one receiver to another in the array in relation to their respective angular positions,
(Continued)

to designate a maximum peak angular position associated with a maximum pulse count value, and to attribute the peak angular position to an angular emitter location.

28 Claims, 14 Drawing Sheets

(51) Int. Cl.
G01S 5/16 (2006.01)
G05D 1/02 (2006.01)
G01S 5/02 (2010.01)
G01S 5/18 (2006.01)
G01S 11/14 (2006.01)
G06F 3/0346 (2013.01)
G06F 17/18 (2006.01)
G01S 3/784 (2006.01)
G01S 11/12 (2006.01)

(52) U.S. Cl.
CPC ............... *G01S 5/16* (2013.01); *G01S 5/186* (2013.01); *G01S 11/14* (2013.01); *G05D 1/028* (2013.01); *G06F 3/0346* (2013.01); *G06F 17/18* (2013.01); *G01S 11/12* (2013.01)

(56) References Cited

U.S. PATENT DOCUMENTS

| | | | |
|---|---|---|---|
| 3,918,297 | A | 11/1975 | Rocha |
| 4,458,340 | A | 7/1984 | Lautzenhiser |
| 4,740,792 | A | 4/1988 | Sagey et al. |
| 4,851,661 | A | 7/1989 | Everett, Jr. |
| 4,866,526 | A | 9/1989 | Ams |
| 4,924,109 | A | 5/1990 | Weber |
| 5,009,501 | A | 4/1991 | Fenner et al. |
| 5,594,238 | A | 1/1997 | Endruschat |
| 5,640,151 | A | 6/1997 | Reis et al. |
| 5,712,558 | A | 1/1998 | Saint-Cyr |
| 5,757,499 | A * | 5/1998 | Eaton .................. G01C 15/002 356/141.3 |
| 5,977,878 | A | 11/1999 | Lang |
| 5,977,882 | A | 11/1999 | Moore |
| 6,107,938 | A | 8/2000 | Du |
| D435,473 | S | 12/2000 | Eckel |
| 6,163,275 | A | 12/2000 | Hartzell |
| 6,300,904 | B1 | 10/2001 | Dvorak et al. |
| 6,324,296 | B1 | 11/2001 | McSheery et al. |
| 6,369,517 | B2 | 4/2002 | Song |
| 6,504,794 | B2 | 1/2003 | Haase et al. |
| 6,821,211 | B2 | 11/2004 | Otten et al. |
| 7,038,589 | B2 | 5/2006 | Schmidt et al. |
| 7,084,860 | B1 | 8/2006 | Jaeger et al. |
| 7,115,856 | B2 | 10/2006 | Peng |
| 7,116,056 | B2 | 10/2006 | Jacoby, Jr. |
| 7,423,576 | B2 | 9/2008 | Sahinoglu et al. |
| 7,512,505 | B2 | 3/2009 | Harles |
| 7,518,738 | B2 | 4/2009 | Cavallucci |
| 7,653,883 | B2 | 1/2010 | Hotelling et al. |
| 7,656,308 | B2 | 2/2010 | Atkins |
| 7,761,814 | B2 | 7/2010 | Rimas-Ribikauskas et al. |
| 7,852,318 | B2 | 12/2010 | Altman |
| 7,973,589 | B2 | 7/2011 | Rothenberger |
| 8,217,482 | B2 | 7/2012 | Basoor |
| 8,294,576 | B2 | 10/2012 | Matsuoka |
| 8,363,894 | B2 | 1/2013 | Gerber |
| 8,507,863 | B2 | 8/2013 | Holenarsipur |
| 2001/0055353 | A1 | 12/2001 | Rybicki et al. |
| 2004/0056849 | A1 | 3/2004 | Jaeger et al. |
| 2004/0127304 | A1 | 7/2004 | Plank |
| 2004/0186623 | A1 | 9/2004 | Dooley et al. |
| 2006/0166681 | A1 | 7/2006 | Lohbihler |
| 2007/0193582 | A1 | 8/2007 | Kwok |
| 2008/0029316 | A1 | 2/2008 | Jaeger et al. |
| 2008/0042993 | A1 | 2/2008 | Jaeger et al. |
| 2008/0084271 | A1 | 4/2008 | Jaeger et al. |
| 2008/0192025 | A1 | 8/2008 | Jaeger et al. |
| 2008/0279287 | A1 | 11/2008 | Asahina |
| 2008/0316085 | A1 | 12/2008 | Rofougaran et al. |
| 2008/0316104 | A1 | 12/2008 | Seong et al. |
| 2010/0135651 | A1 | 6/2010 | Tiraby |
| 2011/0121181 | A1 | 5/2011 | Costello |
| 2011/0279366 | A1 * | 11/2011 | Lohbihler ............. G01S 5/0247 345/157 |
| 2011/0316453 | A1 | 12/2011 | Ewing |
| 2012/0248992 | A1 | 10/2012 | Jeon et al. |
| 2012/0262071 | A1 | 10/2012 | Briggs |
| 2013/0141009 | A1 | 6/2013 | Jin et al. |
| 2013/0214166 | A1 | 8/2013 | Barlow |
| 2013/0300316 | A1 | 11/2013 | Engel-Hall |

FOREIGN PATENT DOCUMENTS

| | | |
|---|---|---|
| CN | 2169142 Y | 6/1994 |
| CN | 1349149 A | 5/2002 |
| CN | 1241379 | 2/2006 |
| CN | 1997959 | 7/2007 |
| EP | 0392152 A2 | 10/1990 |
| EP | 1178454 B1 | 2/2002 |
| EP | 0835584 B1 | 5/2004 |
| EP | 1552988 A3 | 7/2005 |
| EP | 1815723 A1 | 6/2006 |
| GB | 1248066 A | 9/1971 |
| GB | 1248066 A | 9/1971 |
| JP | H04/034307 A | 2/1991 |
| JP | H04/034307 | 2/1992 |
| JP | H04/280127 | 10/1992 |
| JP | H04/280127 A | 10/1992 |
| JP | H06/174831 A | 6/1994 |
| JP | H07/294617 | 11/1995 |
| JP | H09/133747 | 5/1997 |
| JP | H09/292454 | 11/1997 |
| JP | 2010/111641 A | 4/2000 |
| JP | 2002168934 A | 6/2002 |
| JP | 2002/365364 A | 12/2002 |
| JP | 2004534212 A | 11/2004 |
| JP | 2004536634 A | 12/2004 |
| JP | 2004536715 A | 12/2004 |
| JP | 2005/503219 A | 1/2006 |
| JP | 2006/329796 A | 12/2006 |
| JP | 200826310 A | 2/2008 |
| JP | 2009516935 A | 4/2009 |
| JP | 2009/168657 A | 7/2009 |
| WO | 2002/095518 A2 | 11/2002 |
| WO | 2004/015555 | 2/2004 |
| WO | 2006/030422 A2 | 3/2006 |
| WO | 2006/112475 A | 4/2006 |
| WO | 2006056814 A1 | 6/2006 |
| WO | 2007/060749 A1 | 5/2007 |
| WO | 2007/067008 A1 | 6/2007 |
| WO | 2008/141914 | 11/2008 |
| WO | 2015184530 | 12/2015 |
| WO | 2016054736 | 4/2016 |

OTHER PUBLICATIONS

First Office Action and Search Report for Chinese Patent Application No. 201410196787.3 dated Feb. 2, 2016.
First Office Action dated Oct. 3, 2016, Japanese Patent Application No. 2015-18537.
Extended Search Report for Application No. 15849126.6-1206 | 3204787 PCT/CA2015051012 dated May 14, 2018.
Supplementary Search Report for Application No. 15849126.6-1206 | 3204787 PCT/CA2015051012 dated Sep. 21, 2018.
Ryu et al., T-LESS: A Novel Touchless Human-Machine Interface Based on Infrared Proximity Sensing, 2010, IEEE/RSJ International Conference on Intelligent Robots and Systems, Mar. 12, 2010.
First Office Action, Japan Patent Office, Application 2011-546553, dated Feb. 4, 2014.
Extended Search Report, European Patent Office, Application 10735452. 4, dated Feb. 19, 2014.

(56) References Cited

OTHER PUBLICATIONS

First Office Action, Chinese Patent Office, Application 201080014777.3, dated Jan. 22, 2013.
Second Office Action, Chinese Patent Office, Application 201080014777.3, dated Sep. 11, 2013.
Notice to Grant, Chinese Patent Office, Application 201080014777.3, dated Feb. 26, 2014.
Second Office Action, Japan Patent Office, Application 2011-546553, dated Sep. 8, 2014.
International Search Report and Written Opinion of the International Searching Authority for International Application No. PCT/CA2010/000095, dated Jul. 7, 2010.
First Communication dated Jul. 8, 2016, Korean Patent Application No. 10-2011-7019943.
"Gesturesense Z-40-D" datasheet, XYZ Technologies Inc., Mar. 21, 2011.
International Search Report for International Application No. PCT/CA2015/000383, dated Nov. 18, 2015.
Written Opinion for the International Search Authority for International Application No. PCT/CA2015/000383, dated Nov. 18, 2015.
International Search Report for International Application No. PCT/CA2015/051012 dated Feb. 15, 2016.
Written Opinion of the International Search Authority for International Application No. PCT/CA2015/051012 dated Feb. 15, 2016.
Office Action for Canadian Patent Application No. 2,764,120 dated Jan. 25, 2016.
Office Action for Japanese Patent Application No. 2011-546553 dated Jan. 19, 2015.
Office Action for Japanese Patent Application No. 2011-546553 dated May 18, 2015.

* cited by examiner

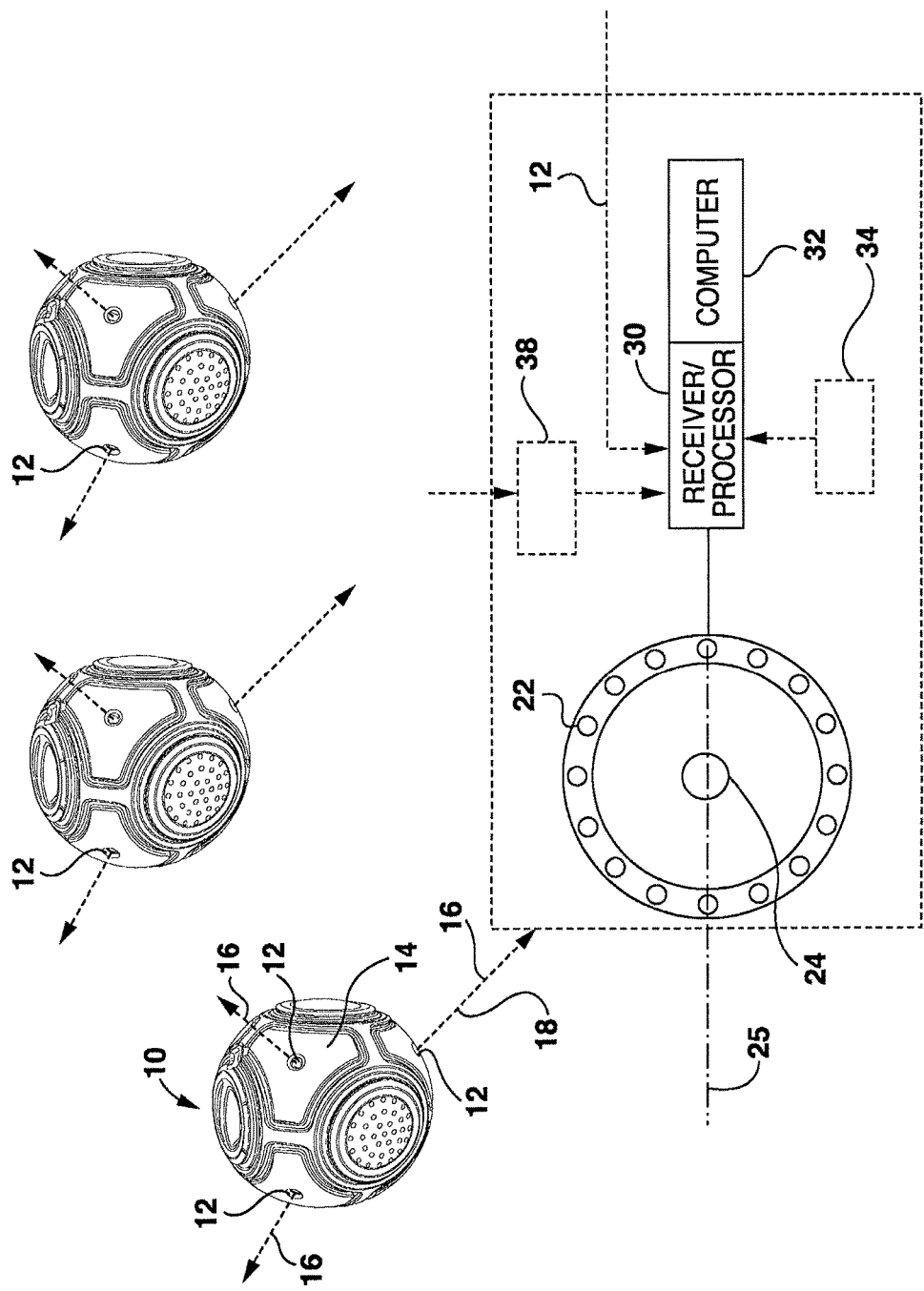

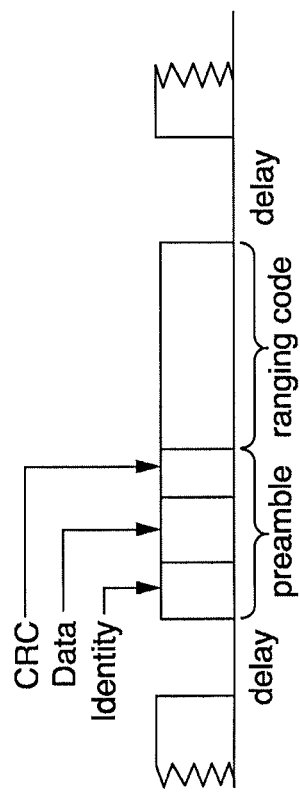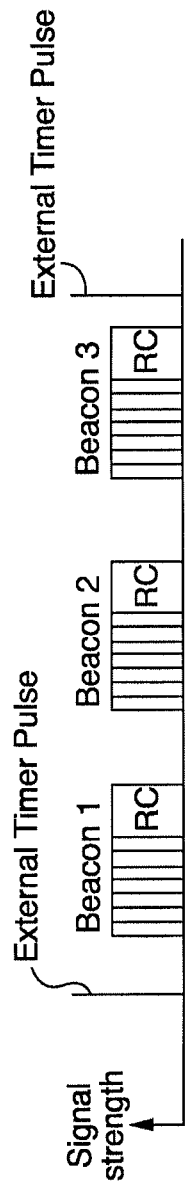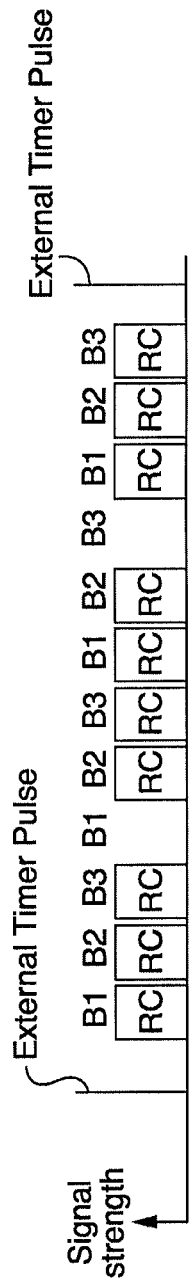

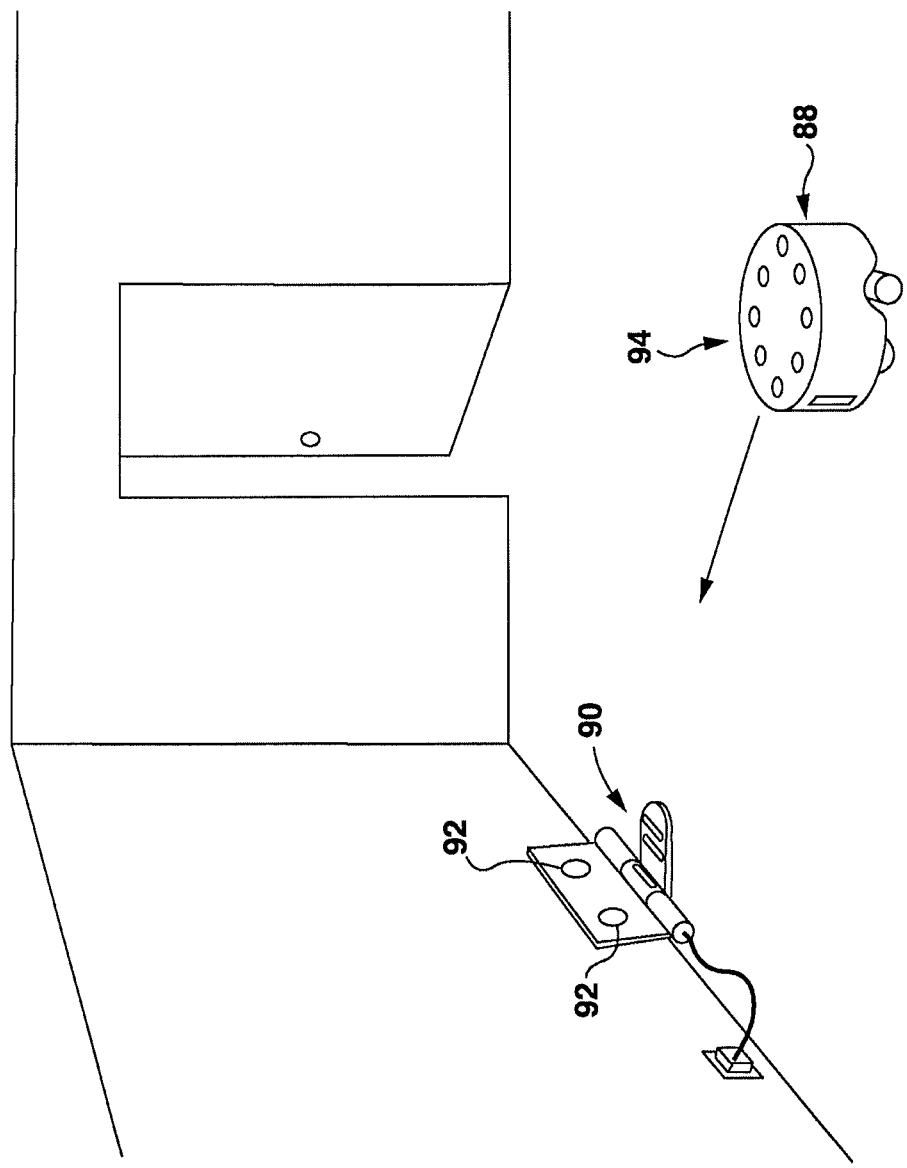

DEVICE AND METHOD FOR ORIENTATION AND POSITIONING

REFERENCE TO COPENDING APPLICATIONS

The entire subject matter, including materials submitted at filing, of the following applications is fully incorporated herein by reference:

U.S. Provisional Patent Application No. 61/147,711; filed Jan. 27, 2009 entitled "A METHOD AND APPARATUS FOR RANGING FINDING, ORIENTING, AND POSITIONING OF SINGLE OR MULTIPLE DEVICES";

PCT Patent Application CA2010/000095; filed Jan. 27, 2010 entitled "A METHOD AND APPARATUS FOR RANGING FINDING, ORIENTING, AND POSITIONING OF SINGLE AND/OR MULTIPLE DEVICES" and designating the United States;

U.S. Provisional Patent Application No. 61/367,787; filed Jul. 26, 2010 entitled "A METHOD AND APPARATUS FOR RANGING FINDING, ORIENTING, AND POSITIONING OF SINGLE AND/OR MULTIPLE DEVICES";

U.S. Provisional Patent Application No. 61/369,994; filed Aug. 2, 2010 entitled "A METHOD AND APPARATUS FOR RANGING FINDING, ORIENTING, AND POSITIONING OF SINGLE OR MULTIPLE DEVICES";

U.S. Provisional Patent Application No. 61/371,053; filed Aug. 5, 2010 entitled "A TOUCH-LESS TOGGLE/DIRECTIONAL LIGHT SWITCH AND DIMMER"; and U.S. Provisional Application 62/060,769, filed Oct. 7, 2014, entitled DEVICE AND METHOD FOR ORIENTATION AND POSITIONING.

FIELD

The present disclosure relates to sensing positions of objects.

BACKGROUND

Optical navigation is an intuitive and precise way to track moving objects. The optical approach is intuitive because our own human stereo vision system calculates object locations and trajectories by optical triangulation. The precision of optical navigation is due to the very short wavelength of electromagnetic radiation in comparison with typical object dimensions, negligible latency in short distance measurements due to the extremely large speed of light and relative immunity to interference.

Optical navigation typically employs several cameras to determine the position or trajectory of an object in an environment by studying images of the object in the environment. Such optical capturing or tracking systems are commonly referred to as optical motion capture (MC) systems. In general, motion capture tends to be computationally expensive because of significant image pre- and post-processing requirements, as well as additional computation associated with segmentation and implementation of algorithms, see for example U.S. Pat. No. 6,324,296 to McSheery.

Low-cost portable computing devices such as handheld or palm-sized computers can support local communication between nearby computers, or more generally can support wireless network or internetwork communications. Users equipped with suitable portable computers can, for example, exchange e-mail, browse the web, utilize mapping software, control nearby computer peripherals (e.g. printers), or receive information from local devices (e.g. job status of a printer). The flexibility and utility of various applications can be enhanced if the precise spatial location of the portable computing device is known. Knowing the location of the portable computing device (with a precision of several meters to less than 1 meter, or so) permits construction of user specific maps, transfer of location information to others, and receipt of location information for nearby computational or real world resources (e.g. answering such questions as "where is the nearest printer" or "where is the nearest coffee shop"). For this reason, having easily determinable and reliable position information would be a useful feature.

However, spatial localization with low cost devices can be difficult. Devices incorporating GPS receivers often do not work indoors because of poor radio reception and can require a substantial amount of time to determine position with a required accuracy. In many areas, there may not be any differential GPS availability to gain the necessary meter level precision for greatest utility. Other wireless schemes for localizing spatial position are generally not sufficiently precise (e.g. digital cellular telephone service areas with 1000 meter errors), or too expensive (inertial navigation systems).

It would be desirable to provide a novel approach to location sensing to overcome at least some of the drawbacks of known techniques, or at least that provides a useful alternative.

SUMMARY

The following presents a simplified summary of the general inventive concept herein to provide a basic understanding of some aspects of the invention. This summary is not an extensive overview of the invention. It is not intended to restrict key or critical elements of the invention or to delineate the scope of the invention. Furthermore, any one element feature, or action of any aspect or exemplary embodiment may be combined with any one or more elements from the same or other aspects or exemplary embodiments, herein and throughout the disclosure and claims.

In an aspect, there is provided a method of locating an emitter, comprising:
  enabling an emitter to emit at least one locating signal, the locating signal including, at least in part, a plurality of discrete pulses in a train of pulses;
  enabling each of a plurality of spaced receivers, at a sensing location, to receive the locating signal, each of the receivers having an angular position value associated with a designated angle of the receiver relative to a reference axis of the sensing location;
  processing the locating signal received at each receiver to form a pulse value in relation to a count of pulses above a pulse strength threshold, and correlating the pulse value with the angular position value to form a pulse count value;
  identifying an aligned receiver associated with a maximum pulse count value as the receiver aligned with the emitter, and attributing the aligned receiver's angular position value to an angular location value of the emitter, relative to the reference axis.

Some exemplary embodiments may further comprise enabling the emitter to configure a minimum strength of each pulse according to the pulse strength threshold.

Some exemplary embodiments may further comprise determining the maximum pulse count value according to:

Maximum Pulse Count Value=SUM [A[i]*E[i]]/SUM
 [E[i]], for i=1, . . . ,N for "i" being the index of each receiver, and N is the total number of receivers;
A[i] is the angular position value of the receiver "i"; and
E[i] is the pulse count value of the receiver "i".

Some exemplary embodiments may further comprise:
enabling the emitter to change the strength of each pulse from one pulse to another along the train of pulses; and
attributing the maximum pulse count value to a range value of the emitter relative to the sensing location.

In some exemplary embodiments, the maximum pulse count value may be determined according to:

Maximum Pulse Count Value=MAX [E[i]], at A[k],
 for i=1, . . . ,N, where "i" is an index value corresponding to each receiver, and N is a total number of receivers,
A[i] is the angular position value of the receiver "i".
E[i] is the pulse count value of the receiver "i".
"k" is the aligned receiver, and
A[k] is the angular location value.

Some exemplary embodiments may further comprise enabling the emitter to emit an emitter identifier.

Some exemplary embodiments may further comprise enabling the emitter to emit the emitter identifier in the locating signal.

Some exemplary embodiments may further comprise enabling the emitter to emit the emitter identifier as a series of pulses ahead of the train of pulses.

Some exemplary embodiments may further comprise emitting the emitter identifier in an emitter identifier signal different from the locating signal.

Some exemplary embodiments may further comprise enabling the receiver to identify the emitter by the emitter identifier.

Some exemplary embodiments may further comprise enabling the emitter to emit the train of pulses in a single burst, with the pulses having the same or different strengths.

Some exemplary embodiments may further comprise enabling the emitter to emit repeated trains of pulses in repeating single bursts.

Some exemplary embodiments may further comprise enabling the emitter to emit the emitter identifier to include a location code.

Some exemplary embodiments may further comprise accessing the location code from an addressable network source and/or from memory.

Some exemplary embodiments may further comprise enabling the emitter to emit the locating signal intermittently, continuously or following receipt of an interrogatory or synchronizing signal.

Some exemplary embodiments may further comprise enabling the emitter to emit the locating signal at a carrier frequency selected from the group comprising: near infrared, far infrared, visible, ultra-violet, high frequency radio, ultra wideband radio, and ultrasonic.

Some exemplary embodiments may further comprise enabling a first object, carrying the receiver, to travel relative to, toward or away from the emitter.

Some exemplary embodiments may further comprise enabling a second object, carrying the emitter, to travel relative to, toward or away from the receiver.

Some exemplary embodiments may further comprise, for each of the first and the second emitters, the steps as defined in one or more of the aspects and/or exemplary embodiments of the present disclosure.

In another aspect, there is provided a method of locating a first emitter and a second emitter, comprising:
enabling each of the first and second emitters to emit, respectively, at least one first and second locating signal, the first and second locating signals each including, at least in part, a plurality of discrete pulses in a train of pulses;
enabling selected ones of a plurality of spaced receivers, at a sensing location, to receive the first and second locating signals, each of the receivers having an angular position value associated with a designated angle of the receiver, relative to a reference axis of the sensing location;
processing the first and second locating signals to form respective first and second pulse values in relation to first and second counts of pulses above a pulse strength threshold, and correlating the first and second pulse values with the corresponding receiver's angular position value to form first and second pulse count values;
identifying a first aligned receiver associated with a first maximum pulse count value as the first receiver aligned with the first emitter, and attributing the first aligned receiver's angular position value to an angular location value of the first emitter relative to the reference axis; and
identifying a second aligned receiver associated with a second maximum count value as the second receiver aligned with the second emitter, and attributing the angular position value of the second aligned receiver to an angular location value of the second emitter relative to the reference axis.

Some exemplary embodiments may further comprise the first and second emitters to configure a minimum strength of each pulse according to the pulse strength threshold.

Some exemplary embodiments may further comprise:
enabling the first and second emitters to change the strength of each pulse from one pulse to another along the train of pulses;
attributing the first maximum pulse count value to a first range value of the first emitter, relative to the reference axis; and
attributing the second maximum point count value to a second range value of the second emitter, relative to the reference axis.

Some exemplary embodiments may further comprise enabling the first and second emitters to emit a common locating signal.

In another aspect, there is provided a beacon device, comprising a plurality of emitters distributed along an emitter surface, each to emit at least one locating signal along a unique axis, the locating signal including, at least in part, a plurality of discrete pulses in a train of pulses.

In some exemplary embodiments, the emitters may be distributed in a symmetric or asymmetric, spatial and/or or angular pattern along the emitter surface.

Some exemplary embodiments may further comprise a trigger circuit responsive to an input to enable the beacon processor to initiate the locating signal.

In some exemplary embodiments, the beacon may be configured to receive or generate a synchronizing signal to control timing of the locating signal.

In some exemplary embodiments, the emitter surface may be curved or angled.

In some exemplary embodiments, the emitter surface being, at least in part, spherical, prism, pyramidal, cylindrical, and/or conical.

In some exemplary embodiments, the emitter surface may be, at least in part, spherical, with the emitters being distributed on the surface.

In another aspect, there is provided a device for locating an emitter, comprising a plurality of spaced receivers, at a sensing location, to receive at least one locating signal from the emitter, each of the receivers having an angular position value associated with a designated angle of the receiver relative to a reference axis of the sensing location, the locating signal including, at least in part, a plurality of discrete pulses in a train of pulses, at least one processor configured to:

process the locating signal received at each receiver to form a pulse value in relation to a count of pulses above a pulse strength threshold;

correlate the pulse value with the angular position value to form a pulse count value, and identify an aligned receiver associated with a maximum pulse count value as the receiver aligned with the emitter; and attribute the angular position value of the aligned receiver to an angular location value of the emitter relative to the reference axis.

In some exemplary embodiments, the strength of each pulse in the locating signal, received by the receiver, changes from one pulse to another along the train of pulses. In this case, the at least one processor configured to attribute the maximum pulse count value to a range value of the emitter relative to the sensing location.

In another aspect, there is provided a locating device comprising a plurality of spaced receivers positioned on a receiver surface at a sensing location, to receive at least one locating signal from a beacon device as defined in the present disclosure, each of the receivers having an angular position value associated with a designated angle of the receiver relative to a reference axis of the sensing location, the locating signal including, at least in part, a plurality of discrete pulses in a train of pulses, at least one processor configured to:

process the locating signal received at each receiver to form a pulse value in relation to a count of pulses above a pulse strength threshold;

correlate the pulse value with the angular position value to form a pulse count value, and identify an aligned receiver associated with a maximum pulse count value, as the receiver aligned with the beacon device, and attribute the angular position value of the aligned receiver to an angular location value of the beacon device relative to the reference axis.

In some exemplary embodiments, the strength of each pulse in the locating signal, received by the receiver, changes from one pulse to another along the train of pulses; the at least one processor configured to attribute the maximum pulse count value to a range value of the emitter relative to the sensing location.

Some exemplary embodiments may further comprise an emitter configured to emit an interrogation signal to be recognized by the beacon device, to cause the beacon device to emit the locating signal.

In some exemplary embodiments, the receiver surface may be, at least in part, curved or angled.

In some exemplary embodiments, the receiver surface may be, at least in part, spherical, prism, pyramidal, cylindrical, and/or conical.

In some exemplary embodiments, the receiving surface may be, at least in part, spherical, the receivers being distributed on the surface.

In some exemplary embodiments, the receiving surface may be, at least in part, spherical, the receivers being distributed on the surface.

In another aspect, there is provided an assembly of interactive objects, comprising:

a first object having at least one first emitter and at least one first receiver; and a second object having at least one second emitter and at least one second receiver;

the at least one first emitter and at least one second receiver carrying out a method as defined in one or more of the aspects and/or exemplary embodiments as defined in the present disclosure; and the at least one second emitter and at least one first receiver carrying out a method as defined in one or more of the aspects and/or exemplary embodiments as defined in the present disclosure.

In some exemplary embodiments, the first and second objects may be selected from the group comprising:

i) motorized objects capable of moving relative to one another;

ii) motorized object and one or more stationary object;

iii) motorized toys capable of moving relative to one another;

iv) a movable device and a reference unit therefor;

v) a robotic device and a reference unit therefor;

vi) a robotic vacuum and a reference unit therefor;

vii) a camera, cell phone, vehicle, appliance and/or accessory, and a reference unit therefor;

viii) a movable sport object from any one of archery, model aircraft, badminton, football, baseball, volleyball, rugby, tennis, basketball, golf, hockey, cricket, squash, tennis;

ix) a weapon and/or a projectile reference unit therefor; and x) a wearable identity tag and a reference unit therefor.

In another aspect, there is provided a method for a locator configuration to locate a locating signal emitter, comprising:

providing a plurality of spaced receivers, including a group of receivers in respective locating signal-receiving angular positions, each of the receivers having an angular position coordinate value, stored in memory, associated with a designated angle of the receiver relative to a reference axis;

enabling each receiver in the group of receivers to receive at least one locating signal from the locating signal emitter, the locating signal including, at least in part, a plurality of pulses in at least one train of pulses;

enabling at least one locator processor, in communication with the spaced receivers, at a first clock increment, to:

process the locating signal received at each receiver in the group of receivers, to form a pulse count value in relation to a count of pulses above a pulse strength threshold;

form a pulse count profile whose coordinates include each pulse count value and the corresponding angular location accessed from memory; and to attribute a designated angular position coordinate value corresponding to a maximum pulse count value in the pulse count profile as a location value representative of at least the heading of the emitter.

In some exemplary embodiments, the pulses in the train of pulses vary in pulse strength from one pulse to another, further comprising enabling the at least one locator processor to attribute a range value to the locating signal emitter, according to the maximum pulse count value. The processor may be enabled to attribute at least the heading value to an emitter identifier to form a first set of emitter identity coordinates, and to store the first set in memory. The first set of coordinates may include the range value. The processor may be enabled for at least a second clock increment to form a second set of emitter identity coordinates, and to store the second set in memory. The receiver may be enabled to receive the emitter identifier from the emitter or from memory.

In some exemplary embodiments, the processor may be configured to calculate the angular position value according to:

Angular Position Value=SUM [$A[i]*E[i]$]/SUM [$E[i]$], for i=1, . . . , N where "i" is the index of each receiver;

N is the total number of receivers;

$A[i]$ is the angular position value of the receiver "i"; and $E[i]$ is the pulse count value of the receiver "i".

In some exemplary embodiments, the designated angular position value may correspond to an angular position value of a receiver registering the maximum pulse count value. The designated angular position value may be adjacent or between one or more neighboring angular position values of one or two receivers.

Some exemplary embodiments may further comprise enabling at least one emitter processor, in communication with the emitter, to emit the at least one locating signal with or without the emitter identifier. The emitter processor may be enabled to configure a minimum strength of each pulse according to the pulse strength threshold. The emitter may be enabled to change the strength of each pulse, or to fix the strength of each pulse, from one pulse to another along the train of pulses. The emitter processor may be enabled to configure the emitter to emit the emitter identifier in the locating signal. The emitter identifier may be ahead of the train of pulses.

In some exemplary embodiments, the emitter identifier may be, or be in, an emitter identifier signal different from the locating signal. The locating signal may include a single train of pulses in repeating single bursts. The locating signal may include repeating trains of pulses in repeating single bursts.

Some exemplary embodiments may further comprise enabling the emitter processor to configure the emitter to emit the locating signal intermittently, continuously or following receipt of an interrogatory or synchronizing signal. The emitter processor may be enabled to configure the emitter to emit the locating signal at a carrier frequency selected from the group comprising: near infrared, far infrared, visible, ultra-violet, high frequency radio, ultra-wideband radio, and ultrasonic.

Some exemplary embodiments may further comprise enabling the locator processor to initiate an action in relation to the first and/or second sets of coordinates. The initiating an action may include deploying a drive train, or issuing an instruction. The deploying a drive train may include instructing the drive train to move toward, or away from, the emitter. The instruction may be a written message, such as an SMS text or the like, an audio or a graphical message. Further, the action may be configured according to a received instruction.

In some exemplary embodiments, the instruction may be retrieved from memory, the locating signal or a received instructional signal.

In some exemplary embodiments, the emitters may be located over one or more surface regions of an object, wherein the locating of an emitter identifies an orientation of the object. The locating of an emitter may identify a portion of the object facing the receivers.

In some exemplary embodiments, the receivers are aligned, at least in part, along a curve relative to the reference axis.

In some exemplary embodiments, the receivers may organized in adjacent rows, wherein the receivers in each row receive locating signals at different angular positions corresponding to different heading angle values, at a common designated elevation angle, of the emitter.

In some exemplary embodiments, the receivers may be organized in adjacent rows, wherein the receivers in each row receive locating signals at different angular positions corresponding to different heading angle values, at a common designated elevation angle, of the emitter, according to:

Heading=SUM [$A[i]*E[i,j]$]/SUM [$E[i,j]$],
    for i=1, . . . ,N

Elevation=SUM [$B[j]*E[i,j]$]/SUM [$E[i,j]$],
    for j=1, . . . ,M for (i,j) being the index of each receiver, and N is the total number of heading receiver elements, and M is the total number of elevation receiver elements.

$A[i]$ is the fixed heading angle of the receiver element "i".

$B[j]$ is the fixed elevation angle of the receiver element "j".

$E[i,j]$ is the IR pulse energy received at receiver element "(i,j)".

In another aspect, there is provided an assembly comprising a first object and a second object, each of the first and second objects including at least one locator processor in communication with a plurality of receivers and configured to carry out one or more method actions as defined in the present disclosure and/or claims, and at least one emitter processor in communication with at least one emitter and configured to carry out one or more method actions defined in the present disclosure and/or claims herein.

In another aspect, there is provided a system for locating an emitter, comprising:

a plurality of spaced receivers, each of the receivers having an angular position coordinate value, stored in memory, associated with a designated angle of the receiver relative to a reference axis;

each receiver configured to receive at least one locating signal from the emitter, the locating signal including, at least in part, a plurality of pulses in at least one train of pulses;

at least one locator processor, in communication with the spaced receivers, the at least one locator processor configured to:

process the locating signal received at each receiver in a group of receivers in respective locating signal-receiving positions, to form a pulse count value in relation to a count of pulses above a pulse strength threshold;

form a pulse count profile whose coordinates include the pulse count values and corresponding angular locations; and attribute a designated angular position coordinate value, corresponding to a maximum pulse count value in the pulse count profile, as a location value representative of at least the heading of the emitter.

In some exemplary embodiments, the pulses in the train of pulses may vary in pulse strength from one pulse to another, the locator processor may be configured to attribute a range value to the locating signal emitter, according to the maximum pulse count value. The locator processor may be configured to attribute at least the heading value to an emitter identifier to form a first set of emitter locating coordinates, and to store the first set in memory. The first set may include the range value.

In some exemplary embodiments, the locator processor may be configured, for at least a second clock increment, to form a second set of emitter locating coordinates, and to store the second set in memory. The locator processor may be configured to access the emitter identifier from the emitter or from memory.

In some exemplary embodiments, the locator processor may be configured to calculate the angular position value according to:

Angular Position Value=SUM $[A[i]*E[i]]$/SUM $[E[i]]$, for i=1, . . . , N where "i" is the index of each receiver;
N is the total number of receivers;
A[i] is the angular position value of the receiver "i"; and
E[i] is the pulse count value of the receiver "i".

In some exemplary embodiments, the designated angular position value may correspond to an angular position value of a receiver registering the maximum pulse count value. The designated angular position value may be adjacent an angular position value of at least one receiver.

Some exemplary embodiments may further comprise at least one emitter processor, in communication with the emitter, and configured to enable the emitter to emit the locating signal with or without the emitter identifier.

In some exemplary embodiments, the emitter processor may be further configured to set a minimum strength of each pulse according to the pulse strength threshold. The emitter processor may be configured to change the strength of each pulse, or to fix the strength of each pulse, from one pulse to another along the train of pulses. The emitter processor may be configured to enable the emitter to emit the emitter identifier in the locating signal. The emitter identifier may be ahead of the train of pulses. The emitter identifier may be in an emitter identifier signal different from the locating signal.

In some exemplary embodiments, the locating signal may include a single train of pulses in repeating single bursts. The locating signal may include repeating trains of pulses in repeating single bursts. The emitter processor may be configured to enable the emitter to emit the locating signal intermittently, continuously or following receipt of an interrogatory or synchronizing signal. The emitter processor may be configured to enable the emitter to emit the locating signal at a carrier frequency selected from the group comprising: near infrared, far infrared, visible, ultra-violet, high frequency radio, ultra-wideband radio, and ultrasonic.

In some exemplary embodiments, the locator processor may be configured to initiate an action in relation to the first and or second sets of coordinates. The action may include deploying a drive train. The action may be a text, an audio message, or graphical message. The local processor may be configured to select the action according to a received instruction. The received instruction may be retrieved from memory, the locating signal or a received instructional signal. The deploying a drive train may include instructing the drive train to move toward, and/or away from, the emitter.

Some exemplary embodiments may further comprise the drive train.

Some exemplary embodiments may further comprise a beacon with a body defining one or more surface regions, further comprising a plurality of the emitters located on said one or more surface regions. The receivers may be aligned, at least in part, along a curve relative to the reference axis. The receivers may be organized in adjacent rows, wherein the receivers in each row receive locating signals at different angular positions corresponding to different heading angle values, at a common designated elevation angle, of the emitter.

In some exemplary embodiments, the receivers are organized in adjacent rows, wherein the receivers in each row receive locating signals at different angular positions corresponding to different heading angle values, at a common designated elevation angle, of the emitter, according to:

Heading=SUM $[A[i]*E[i,j]]$/SUM $[E[i,j]]$,
for i=1, . . . ,N

Elevation=SUM $[B[j]*E[i,j]]$/SUM $[E[i,j]]$,
for j=1, . . . ,M for (i,j) being the index of each receiver, and N is the total number of heading receiver elements, and M is the total number of elevation receiver elements.
A[i] is the fixed heading angle of the receiver element "i".
B[j] is the fixed elevation angle of the receiver element "j".
E[i,j] is the IR pulse energy received at receiver element "(i,j)".

In another aspect, there is provided an assembly comprising first and second objects, wherein the first object comprises the at least one emitter and at least one emitter processor as disclosed in the disclosure and/or claims herein, the second object comprising the plurality of receivers and at least one locator processor as disclosed in the disclosure and/or claims herein. The first and second objects may be selected from the group comprising:
  i) motorized objects capable of moving relative to one another;
  ii) motorized object and one or more stationary object;
  iii) motorized toys capable of moving relative to one another;
  iv) a movable device and a reference unit therefor;
  v) a robotic device and a reference unit therefor;
  vi) a robotic vacuum and a reference unit therefor;
  vii) a camera, cell phone, vehicle, appliance and/or accessory, and a reference unit therefor;
  viii) a movable sport object from any one of archery, model aircraft, badminton, football, baseball, volleyball, rugby, tennis, basketball, golf, hockey, cricket, squash, tennis;
  ix) a weapon and/or a projectile reference unit therefor;
  x) a drone and a reference unit therefor; and
  xi) a wearable identity tag and a reference unit therefor.

In another aspect, there is provided a locator device comprising a plurality of receivers and at least one locator processor as defined in the disclosure and/or claims herein.

In another aspect, there is provided a beacon device comprising at least one emitter and at least one emitter processor as defined in the disclosure and/or claims herein.

In another aspect, there is provided a method of locating a first emitter and a second emitter, comprising:

a. enabling each of a plurality of spaced receivers, relative to a sensing location, to receive a first locating signal from a first emitter, and a second locating signal from a second emitter, the first locating signal including, at least in part, a plurality of pulses in a first train of pulses, the second locating signal including, at least in part, a plurality of pulses in a second train of pulses, each of the receivers having an angular position value associated with a designated angle of the receiver relative to a reference axis; and b. enabling a processor to:
  1. process the first and second locating signals received at each receiver to form:
    a. a first pulse count value in relation to a first count of pulses above a pulse strength threshold to form a first pulse count profile from the first pulse count values; and
    b. a second pulse count value in relation to a second count of pulses above a pulse strength threshold to form a second first pulse count profile from the second pulse count values; and
  2. attribute a location of the first emitter to a first designated angular position value corresponding to a first maximum pulse count value in the first pulse count profile; and
  3. attribute a location of the second emitter to a second designated angular position value corresponding to a second maximum pulse count value in the second pulse count profile.

In some exemplary embodiments, the first and second locating signals may be the same.

In another aspect, there provided a beacon device, comprising a plurality of emitters distributed along an emitter surface, each to emit at least one locating signal along a unique axis. The locating signal may include, at least in part, a plurality of discrete pulses in a train of pulses.

In some exemplary embodiments, the emitters may be distributed in a symmetric or asymmetric, spatial and/or or angular pattern along the emitter surface.

Some exemplary embodiments may further comprise a beacon configured processor to initiate the locating signal. The beacon processor may be configured to receive or generate a synchronizing signal to control timing of the locating signal.

In some exemplary embodiments, the emitter surface may be curved or angled. The emitter surface may be, at least in part, spherical, prism, pyramidal, cylindrical, and/or conical. The may be distributed on the surface.

In another aspect, there is provided a locating device comprising a plurality of spaced receivers positioned on a receiver surface relative to a sensing location, to receive at least one locating signal from a beacon device as defined in the disclosure and/or claims herein, each of the receivers having an angular position value associated with a designated angle of the receiver relative to a reference axis of the sensing location, the locating signal including, at least in part, a plurality of discrete pulses in at least one train of pulses, and at least one processor configured to:

process the locating signal received at each receiver to form a pulse value in relation to a count of pulses above a pulse strength threshold;

correlate the pulse value with the angular position value to form a pulse count value, and identify an aligned receiver associated with a maximum pulse count value, as the receiver aligned with the beacon device, and attribute the angular position value of the aligned receiver to an angular location value of the beacon device relative to the reference axis.

In some exemplary embodiments, the strength of each pulse in the locating signal may change from one pulse to another along the train of pulses. The at least one processor may be configured to attribute the maximum pulse count value to a range value of the emitter relative to the sensing location.

Some exemplary embodiments may further comprise an interrogation emitter configured to emit an interrogation signal to be recognized by the beacon device, to cause the beacon device to emit the locating signal. A drive train may be provided to be responsive to an instruction signal to move the device relative to the beacon.

In another aspect, there is provided a device for locating at least one emitter, comprising an array of receivers configured in different angular positions about the array relative to a corresponding array location axis, to receive a signal from the emitter having at least one burst containing a train of pulses, and at least one processor configured to profile pulse count values at each receiver, from one receiver to another in the array in relation to their respective angular positions, to designate a maximum peak angular position associated with a maximum pulse count value, and to attribute the peak angular position to an angular emitter location.

In some exemplary embodiments, the peak angular position may be associated with a weighted average of pulse count values for a designated time. The angular emitter location may be linked to the peak angular position of the receiver registering a maximum pulse count value. Each pulse count value may be associated with a count of pulses received by the receiver, according to successive changes of state of the receiver for each pulse received. Each pulse count value may be associated with a time period during which the receiver remains continuously in an ON state for the train of received pulses.

In some exemplary embodiments, the processor may be configured to plot a path toward at least one designated waypoint, according to the angular emitter location, and to issue one or more instructions to initiate movement toward the waypoint. A drive train be provided and configured to move the device toward the waypoint.

In some exemplary embodiments, the processor may be configured to issue instructions for one or more autonomous functions internal or external to the device.

In some exemplary embodiments, a plurality of the emitters may be located at separate locations in an interior or exterior region, thereby to define an associated signal-receiving zone for the receiver array.

In another aspect, there is provided a device as defined herein, wherein the device may be selected from the group comprising;
  a. a motorized object;
  b. a motorized toy;
  c. a movable device;
  d. a robotic device;
  e. a robotic vacuum;
  f. a camera;
  g. a cell phone or smart phone;
  h. an appliance;
  i. a movable sport object from any one of archery, model aircraft, badminton, football, baseball, volleyball, rugby, tennis, basketball, golf, hockey, cricket, squash, tennis;

j. a weapon and/or a drone; and k. an accessory to any one or more of a. to j.

In another aspect, there is provided a method of interacting a target object with a tracking object, comprising:

- providing a tracking object with an array of spaced receivers to be positioned relative to a tracking location, each of the receivers having an angular position value associated with a designated angle of the receiver relative to a reference axis, and at least one action output to initiate an action in relation to the target object;
- enabling the receivers to receive a locating signal from an emitter onboard a target object, the locating signal including, at least in part, a plurality of pulses in a train of pulses;
- assembling pulse count values, each associated with a count of pulses received by those receivers oriented in signal-receiving positions relative to the target object;
- associating the angular positions of the signal receiving receivers to their corresponding pulse count values to identify an angular position corresponding to a maximum pulse count value, as an angular target location of the target object; and
- enabling the action output, in relation to the angular target location.

In some exemplary embodiments, the pulses in the train of pulses may vary in strength from one pulse to another, further comprising identifying a range of the target object relative the reference axis, according to the maximum pulse value.

In some exemplary embodiments, action output is operatively coupled to a drive train for displacing the tracking object.

Some exemplary embodiments may further comprise:

a. for a first time period, mapping a first waypoint relative to the angular location; and b. enabling the action output includes enabling the drive train to displace the tracking object toward the first waypoint.

Some exemplary embodiments further comprise:

c. for a second time period, identifying an updated angular position of the target object;

d. mapping a second waypoint relative to the updated annular position; and e. enabling the drive train to displace the tracking object toward the second waypoint.

In some exemplary embodiments, the mapping may include accessing a stored geographical descriptor corresponding to an interim value according to one of the waypoints, and correcting the interim value according to the angular location to form the waypoint.

In another aspect, there is provided a local navigation system, comprising a. a plurality of beacons for positioning at designated spaced locations in a travel region, each beacon including at least one emitter configured to emit a locating signal;

b. a locating device moveable in the travel region relative to the beacons, the locating device comprising:

ii. a receiver array of spaced receivers to be positioned relative to a tracking location, each of the receivers having an angular position value associated with a designated angle of the receiver relative to a reference axis;

iii. a drive train to move the locating device through the travel region; and iv. at least one processor in operative communication with the receiver array and the drive train, the processor configured to:

1. enabling the receivers to receive locating signals from the emitters, each locating signal including, at least in part, a plurality of pulses in a train of pulses;

2. for each train of pulses received, associating a pulse count value according to a number of pulses received in the train, with an angular position of the corresponding receiver;

3. from the pulse count values for the locating signal received from each beacon, identifying a maximum pulse value and attributing the beacon with the corresponding associated angular position to form a first positional array of angular positions;

4. form a first waypoint in the travel region relative to the first positional array; and 5. initiating the drive train toward the first waypoint;

6. repeating 2 and 3 to form a second positional array;

7. form a second way point in the travel region relative to the second positional array; and 8. initiating the drive train toward the second waypoint.

In another aspect, there is provided a method for locating an least one emitter, comprising receiving, from each receiver in an array of receivers configured in different angular positions about the array relative to a corresponding array location axis, one or more outputs corresponding to a train of pulses in a locating signal received from the emitter, processing the outputs to obtain a pulse count values, to profile the pulse count values at each receiver, from one receiver to another in the array in relation to their respective angular positions, to designate a maximum peak angular position associated with a maximum pulse count value, and to attribute the peak angular position to an angular emitter location.

Additional functions, objects, advantages, and features of the present invention will become apparent from consideration of the following description and drawings of exemplary embodiments.

BRIEF DESCRIPTION OF THE DRAWINGS

Several exemplary embodiments will be provided, by way of examples only, with reference to the appended drawings, wherein:

FIG. 2 is a schematic view of multiple beacon devices and a locating device;

FIGS. 5*a*, 5*b* and 5*c* are schematic views of a time-slotted communication protocol using a timing pulse, while

FIG. 10 is a perspective schematic view of an operational configuration for guiding a robotic device back to a docking station using beacons.

DESCRIPTION OF THE EXEMPLARY EMBODIMENTS

Figure 1:
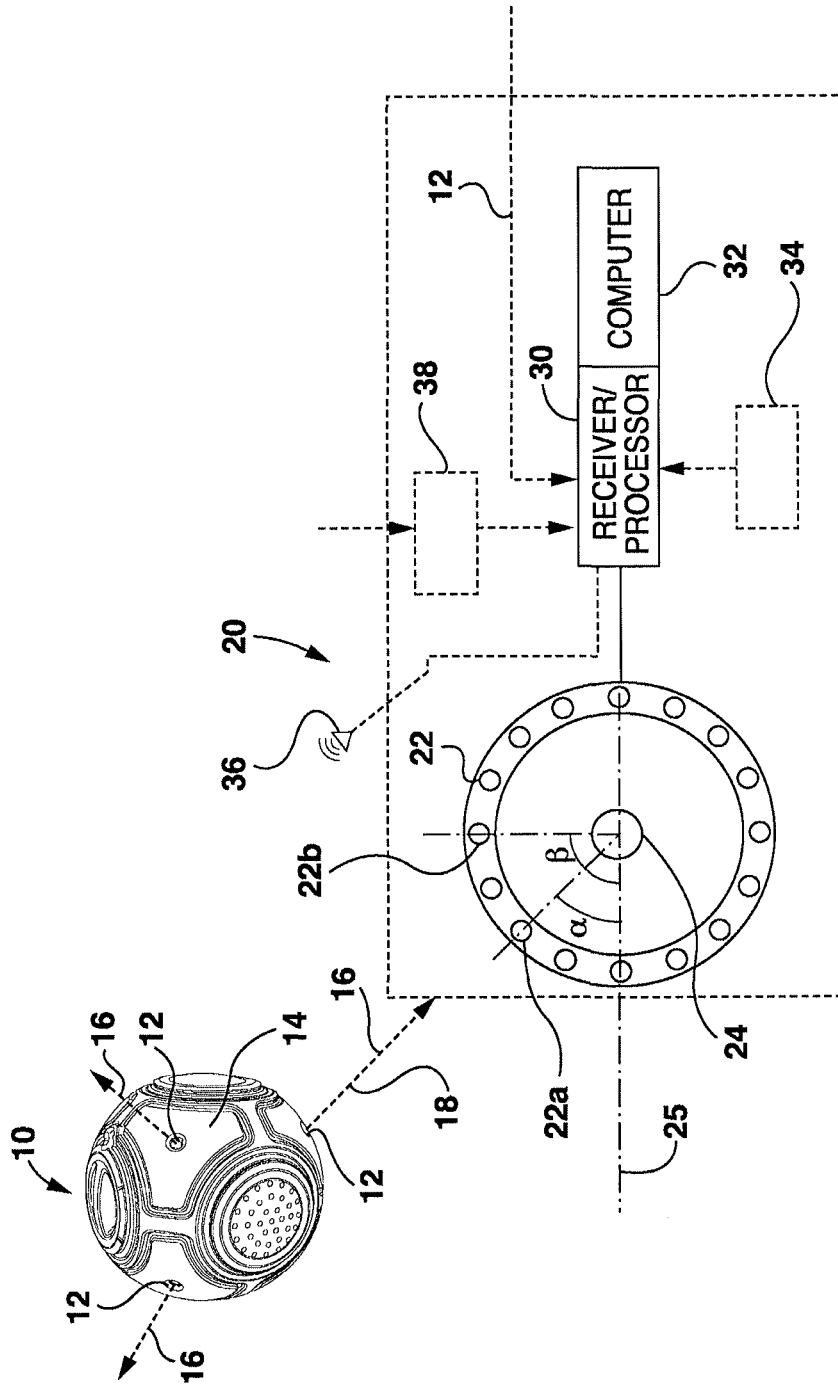
FIG. 1 is a schematic view of a beacon device and a locating device.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical, mechanical or electrical connections or couplings. Furthermore, and as described in subsequent paragraphs, the specific mechanical and/or electrical, other configurations illustrated in the drawings are intended to exemplify embodiments of the invention. However, other alternative mechanical and/or electrical or other configurations are possible which are considered to be within the teachings of the present disclosure.

FIG. 1 shows a beacon device at 10 with at least one, in this case a plurality of emitters 12 which are distributed along an emitter surface 14. Each emitter 12 is configured to emit at least one locating signal 16 along a unique axis 18. The locating signal 16 includes, at least in part, a plurality of discrete pulses in a train of pulses. The locating signal, in particular the train of pulses, is described in further detail in published PCT application PCT/CA2010/000095, which is incorporated herein by reference.

Also shown in FIG. 1 is a device 20 for locating the beacon device 10, by identifying one or more of the emitters 12. The locating device 20 has a plurality of spaced receivers 22, arranged relative to a sensing location 24, to receive at least one locating signal 16. In this case, the spaced receivers 22 are distributed an arc relative to the sensing location 24, though they may be distributed along, or grouped in, one or more linear or curvilinear patterns or clusters. Each of the receivers 22 has an angular position value which is associated with a designated angle of the receiver relative to a reference axis 25 of the sensing location 24. For instance, receivers 22a and 22b have respective angular positions represented by corresponding angles α and relative to the reference axis 25.

In this case, each emitter 12 is configured to emit a locating signal 16 including, at least in part, a plurality of discrete pulses in at least one train of pulses. The locating device 20 includes at least one processor 30, which may be integrated within the functions of, be provided by or be in communication with a computer 32, local to the locating device or accessible thereto via a computer network. (Alternatively, a processor 30 may be associated with each receiver 22.) In the case of the device 20, the processor 30 may be configured to process the locating signal received at each receiver 22 to form a pulse value in relation to a count of pulses above a pulse strength threshold. In the case where the beacon device has a single emitter 12, the processor 30 is configured to correlate the pulse value with the angular position value to form a pulse count value, to identify an aligned receiver associated with a maximum pulse count value as the receiver aligned with the emitter; and to attribute, for example, the angular position value of the aligned receiver, in this case receiver 22a, to an angular location value of the emitter relative to the reference axis. For cases where the beacon device 10 has a plurality of emitters 12, as shown in FIG. 1, the emitters may be configured to identify themselves to the receivers 22, and thus enable the one or more processors 30 to discriminate between signals from each of them, as will be described below.

Among other approaches, responsive to the receivers 22, the processor 30 may be configured to determine the angular location of an emitter 12, and thus the beacon device 10, to detect the maximum pulse count value, for example according to:

Maximum Pulse Count Value=SUM $[A[i]*E[i]]$/SUM $[E[i]]$, for $i=1, \ldots, N$ for "i" being the index of each receiver, and N is the total number of receivers;
A[i] is the angular position value of the receiver "i"; and
E[i] is the pulse count value of the receiver "i".

Thus, the Maximum Pulse Count Value corresponds to an angular position value and may correspond, in some cases, to the angular position of one of the receivers. In other cases, the Maximum Pulse Count Value may correspond to an interpolated or extrapolated position relative to the angular positions of two or more receivers.

This exemplary protocol involves counting pulses above the pulse strength threshold, which may be configured by the processor according to various conditions, such as the nature of the medium, the strength of the emitters, among others. For expected shorter ranges, or distances, between the emitters and the receivers, the threshold may be set at a higher level, and likewise set at a lower level for longer ranges. The emitters may be selected to provide a pulse strength that remains fixed during the course of operation and may be a factory set configuration. Alternatively, or in addition, the emitters 12 may be configured to provide an adjustable minimum strength of each pulse according to the pulse strength threshold.

The emitters 12 may also be configured to change the strength of each pulse from one pulse to another along the train of pulses. Doing so allows the processor 30 to attribute the maximum pulse count value to a range (or distance) value of the emitter relative to the sensing location.

In one example, the maximum pulse count value may be determined according to:

Maximum Pulse Count Value=MAX $[E[i]]$, at $A[k]$, for $i=1, \ldots, N$, where "i" is an index value corresponding to each receiver, and N is a total number of receivers,
A[i] is the angular position value of the receiver "i".
E[i] is the pulse count value of the receiver "i".

"k" is the aligned receiver, and

A[k] is the angular location value.

Figure 1A:
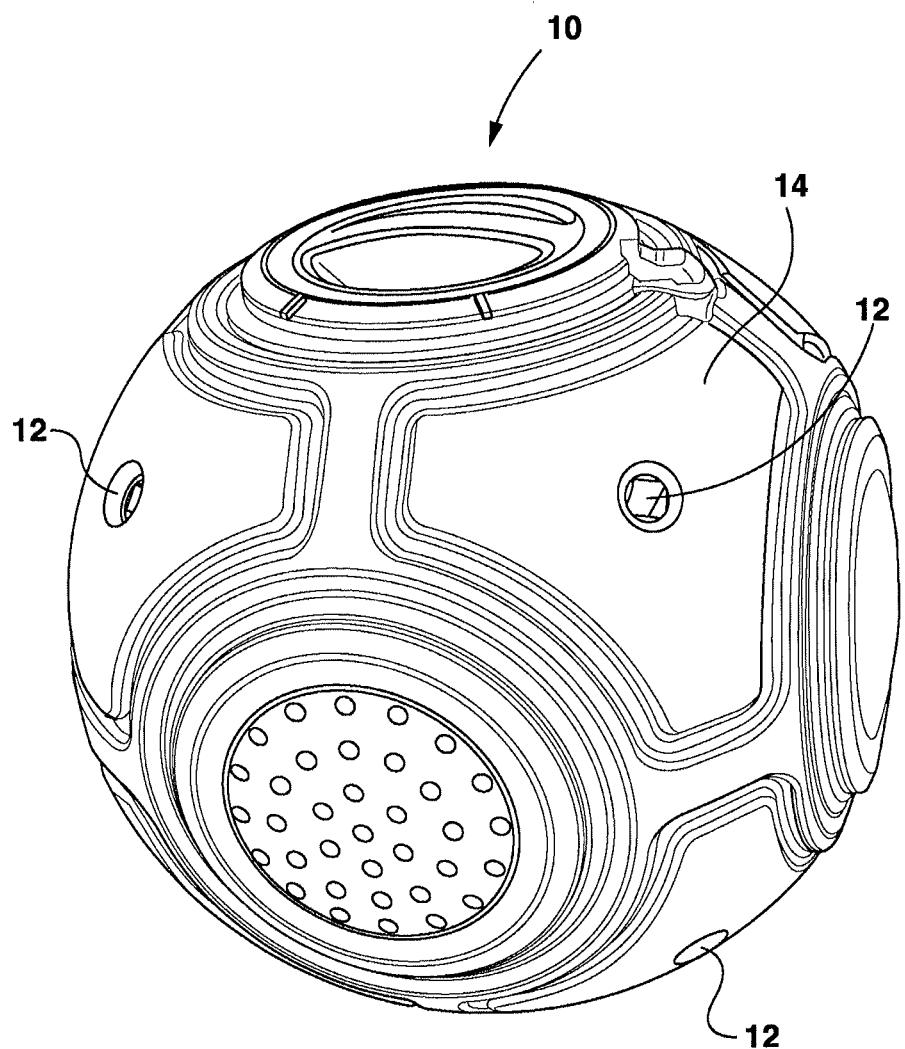
FIG. 1*a* is an enlarged view of the beacon device of FIG. 1.
Figure 1B:
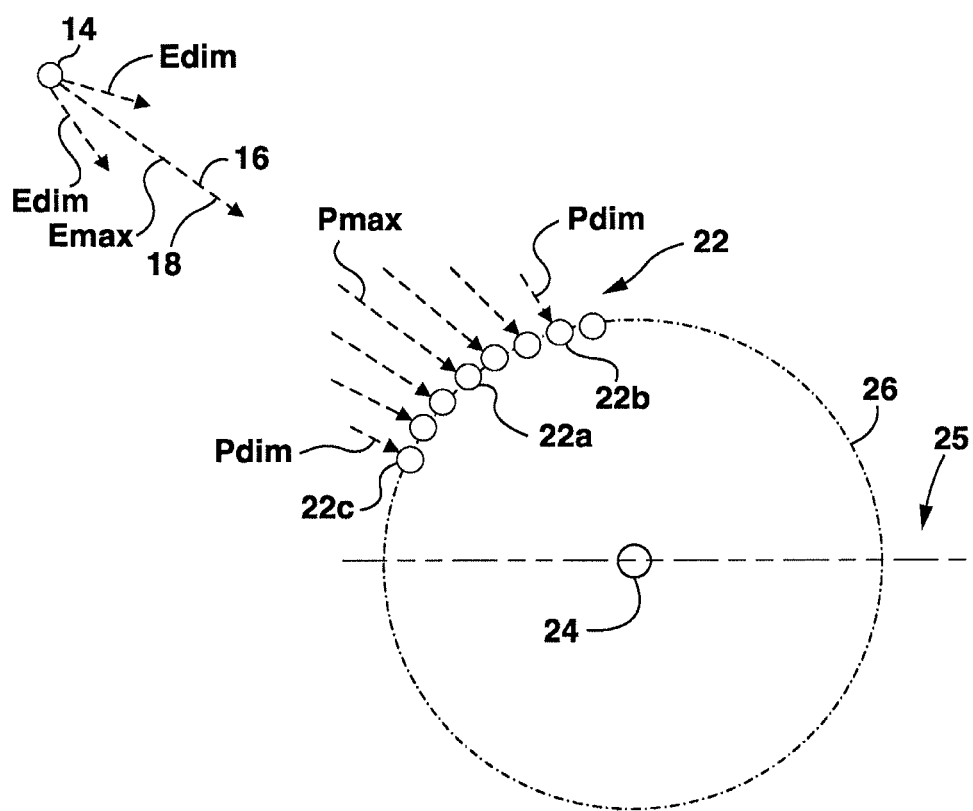
FIG. 1*b* is an operational schematic view of aspects of the beacon and locating devices of FIG. 1.

FIG. 1a shows a magnified view of the beacon device 10. FIG. 1b illustrates an operational example of a method deployed by the processor 30 in the device 20. In this case, an emitter 14, for example from the beacon device 10, is shown to emit a locating signal 16, in this example an IR signal, which is strongest (at Emax) along its axis 18, and diminishes in signal strength with increasing angular deflection away from the axis 18 to a diminished value level (Edim), towards zero. Of course, this signal pattern or waveform of the emitter, giving rise to these relative signal strengths, will depend on the specifications of the emitter in question. For instance, emitters may be selected with wide-angle or narrow-angle emitted signal characteristics. Example infrared emitters include Vishay TSAL6100 beam=20 deg, Vishay TSAL6200 beam=34 deg, Vishay TSAL6400 beam=50 deg, OSRAM SFH4545, beam=10 deg, OSRAM SFH4646-Z, beam=20 deg, The term "beam" in this example, such as beam=20 deg, is intended to mean plus/minus 10 deg on either side of the beam's boresight or central axis as an example. The beam angle is measured as the angle when the beam becomes half as strong as it is on the boresight (i.e. the angle of maximum strength).

Figure 3:
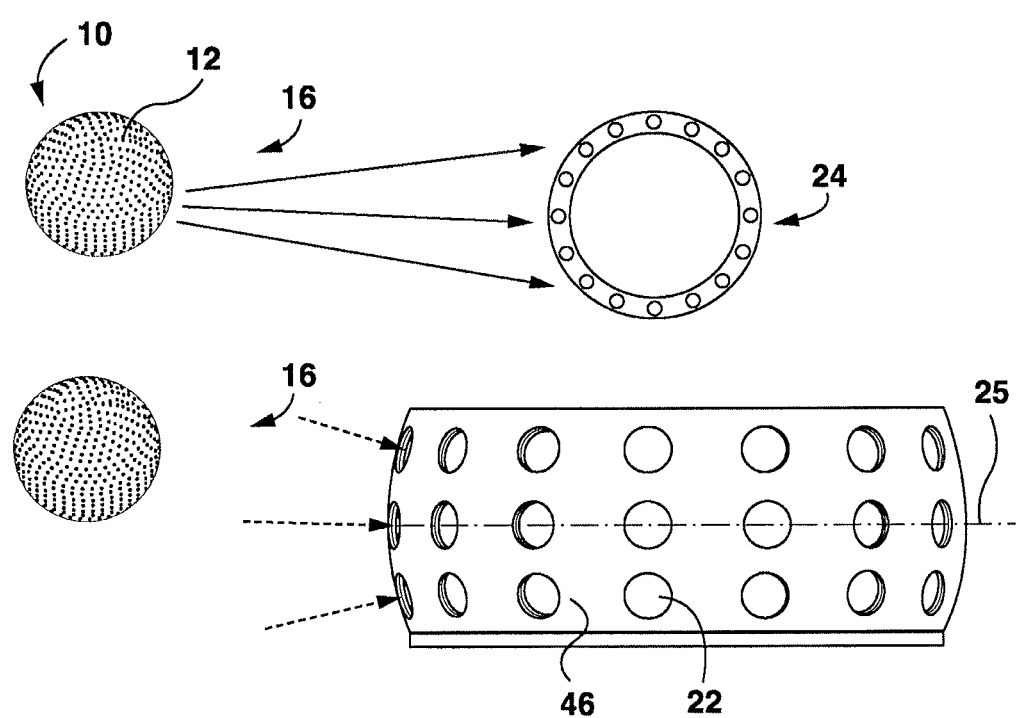
FIG. 3 shows schematic views of a beacon device and a locating device.

The locating signal is to be received by a series of receivers 22, angularly positioned at corresponding known angles relative to a sensing axis 25 (relative to the sensing location 24). A cluster or group of the receivers 22 are shown as part of an array and extending, at least in part, along the periphery of a receiver surface shown schematically at 26, with the receivers in line-of-sight relationship with the emitter. Of course, the extent of the receiver distribution will depend on various factors for a particular application of the device and/or method. A central receiver 22a of the cluster shown, has an axis which is essentially in line-of-sight, and in this case "head on", with the emitter 14, and thus will receive relatively the strongest signal Pmax. Meanwhile, each of the receivers, which is laterally spaced from receiver 22a, receives a progressively weaker signal, owing to the progressive angular deflection of the axis of those receivers relative to the axis of the emitter 12. In this illustration, the axis 18 of each of the receivers in the cluster is shown as integrated with the strength of the locating signal received. For instance, receivers 22b and 22c are shown to receive a diminished signal Pdim (of this cluster of receivers 22). With the angular position of the receivers known, by way of the reference axis 25, the receiver 22a receiving locating signal Pmax can be identified as the aligned receiver, that is aligned with the axis of the emitter 14, and thus the relative position of the emitter can be associated with the angular position of receiver 22a. Of course, FIG. 1b illustrates a two dimensional condition and this approach may be extended to a three dimensional configuration when the receiver surface is oriented accordingly, as for example as shown in FIG. 3, with three rows of receivers 22.

Further, in the case of multiple emitters as shown on the device 10 of FIG. 1, the emitters 12 may be configured to emit an emitter identifier, which may be made or packaged in the locating signal, such as a series of pulses ahead of the train of pulses. Alternatively, the emitter identifier may be emitted in an emitter identifier signal which is different from the locating signal. For instance, the emitter identifier signal may be conveyed in a signal over a wireless channel between the beacon device 10 and the locating device 20. The purpose of doing this is to send the wireless data ahead of the range-code so that it can be received by the appropriate receiver device, to synchronize and to identify the transmitting device ahead of the range-code so the receiver knows which device to associate the range and heading with.

The emitters 12, in this case, are configured to emit the train of pulses in a single burst or in a series of single bursts. During ongoing operation of the emitters 12 and receivers 22, the emitters are enabled to emit repeated trains of pulses in repeating single bursts.

In some cases, the emitters may be configured to integrate a location code in the emitter identifier. In some cases, the location code may be associated with a location value which may be accessed from an addressable network source and/or from memory as shown at 34.

The emitters 12 may be configured, in some exemplary embodiments, to emit the locating signal intermittently, continuously or following receipt of an interrogatory or synchronizing signal, as may be provided by interrogator 36.

In this case, the locating signal is an IR signal, though it may be deployed with a carrier frequency selected from the group comprising: near infrared, far infrared, visible, ultraviolet, high frequency radio, ultra-wideband radio, and ultrasonic.

Thus, as shown in FIG. 1, the one or more emitters 12 may be integrated into a first object, in this case the beacon 10, while the locating device, or components or operative modules thereof, may be integrated into a second object, in this case the locating device 20. The second object may thus be configured to travel relative to, toward or away from the emitter 12 and, hence, the beacon 10. Further, if desired, the first object may be configured to travel relative to, toward or away from the second object.

In the case of the exemplary embodiment of FIG. 1, the beacon device 10 is provided as a beacon ball to be carried by a user (or perhaps thrown, rolled and the like in other activities), and is configured to send locating signals, such as infrared (IR) signals to the locating device 20, in this case a toy object such as a toy robot, represented in this case, again, at 20 in FIG. 1. The beacon ball 10, in one example, may be configured to function in a manner to attract the toy robot, hence to follow the user carrying the beacon ball. This technical activity gives the user the sensation that the toy robot is attracted to or attacking the user depending on the game-play required. Thus, the beacon ball 10 is configured to send the repeating IR signal using an even transmitting distribution of IR signals to provide effective locating signal coverage over the beacon ball outer surface, while the toy robot is configured to detect the same signal from any one of the emitters 12, to decode the communication data, and determine the range and heading of the emitter 12 and thus the beacon ball. However, there may be cases where the beacon ball device may provide a number of emitters 12 which provide different signals, for instance according to their location on the beacon ball, in order to establish a position or orientation of the beacon ball according to the pulses received by the corresponding local position (relative to the device itself) of the aligned emitter 12. FIG. 2 shows a variation in which a plurality of beacons 10 are shown, which are monitored by a common locating device 20.

Exemplary beacons of the present disclosure thus may be used in systems providing the means to determine location, positioning, and orientation of an object with respect to a beacon. Such systems may employ multiple active beacons that can provide a means to determine the location of an object in the environment. Such a system may also be configured to guide an object to a destination beacon, or to a location associated with or in relation to one or more such beacons, based on a plurality of receivers. Examples of this beaconing approach may be used to guide people with cell phones to a specific sales area in a mall or store, such as to provide directions to the cell phone user toward the store of interest, a robot or drone through and to a specific position within a building or household, or to guide a toy automatically to a destination beacon or to a coordinate position determined by a plurality of beacons. In other cases, such systems may provide location, positioning, and orientation of a beacon, for instance, relative to a locating device, for instance where a number of emitters distributed on the beacon surface are identifiable and a maximum pulse count value from an identifiable emitter indicates that the surface neighboring the emitter is facing the locating device.

Exemplary systems of the present disclosure may be configured to be capable of determining spatial location which may be based on low cost infrared equipped devices and infrared beacons. Outdoor situated infrared beacons that broadcast a unique identification number may be located, with improved accuracy, outdoors using differential GPS in a one-time procedure (since the location of the stationary beacon may in some cases only need to be determined once, when situated on an immovable structure.) Indoor situated infrared beacons that broadcast a unique identification number may be more precisely located indoors using architectural plans in combination with accurate survey maps or external GPS of the building, by associating the unique identification number with a specific location value for each beacon. Relative location may also be provided in improved configurations. For example, each room in an office building may be equipped with a unique identification number, and geographic references may be made with respect to room numbers rather than a three dimensional (x,y,z) absolute position. Whether absolute or relative positioning is used, the location information may be linked to the unique identification number available over the Internet or through local database spatial localization services. In operation, a portable computing device, equipped with an infrared receiver may receive the data signal from the infrared beacon, enabling increased precision determination of physical location, both indoors or outdoors. In certain exemplary embodiments, a GPS receiver integrated with a portable computer may be used to roughly determine location, with more precise positioning being handled by reference to infrared beacons.

In an exemplary embodiment, a beacon device, of the present disclosure, may be integrated into conventional transmitter housings suitable for indoor or outdoor usage. The beacon may be a freely moving device with one or a plurality of transmitters affixed to the beacon frame, and/or fixed to a wall or ceiling, or the body of a fixed or moving structure. The infrared beacon may include a light source that is optionally attachable to lighting fixtures that supply electrical power at a determined voltage and a voltage converter electrically and physically connected to the light source. It may be necessary for the transmitting device to have a reduced supplied voltage. For indoor usage, electrical power is typically supplied at 110 Volts AC, and is converted to less than 5 or 6 volts DC by the voltage converter. For stand-alone usage, the transmitting device may be powered by a battery, or use electrically energy harvested by thermal, solar, vibration, or mechanical sources.

In an exemplary embodiment, a beacon in operation powered by a voltage converter, may continuously, intermittently, or in response to an interrogatory signal, broadcast a data signal as well as a range measurable signal. This data signal may be predetermined, and is typically a series of infrared pulses adhering to common transmittable IR carrier frequencies (like 38 KHz and 56 KHz). In certain embodiments, a microcontroller and oscillator may be provided to trigger the microcontroller to initiate the electrical pulse train resulting in broadcast of the data signal. Alternatively, a trigger circuit may be provided which is responsive to infrared, optical, physical (e.g. pushbutton or switch), or radio frequency input, alone or in combination with a microcontroller or oscillator circuit, to initiate broadcast of the data signal.

In an exemplary embodiment, an infrared receiver array is provided including common receiver array modules arranged in a symmetric spatial or angular pattern about the receiver device frame. The receiver elements may be typically arranged in a symmetric configuration to determine the range of the transmitter as well as the received heading or azimuth orientation angles. Each receiver element may be a complete infrared receiver module (like those used in standard TV's, for example a TSSP4038 developed by Vishay Microelectronics), or as a separate diode and infrared signal pre-processor circuit. All receiver elements may be electronically connected to a microprocessor to further process the positional coordinates and orientation angles. In general, the receiver elements may be configured to determine the range and angle of the incoming beacon signal by using a spaced and angled relationship between all receiver elements, to calculate the position coordinates of the beacon, relative to the receiver unit.

In some exemplary embodiments, a base unit may be provided that coordinates a receiver array including a plurality of receivers that receive the signals from the one or more emitters, to process the received signals and determine the one or more emitters, as a measured range or distance away from, and at a specific or designated angle relative to, the position and orientation of the receiver array.

In some exemplary embodiments, an emitter array including a plurality of emitters may transmit a signal that sends an identification of the transmitting unit, as well as a specific ranging "code" or characteristic that can be detected by the receivers. The ranging code is typically a burst of carrier modulated pulses that vary in amplitude or signal strength, that are further arranged in an incrementing or decrementing order. The ranging code may not be restricted to a ramped increment or decrement, as the code can also be a series of interleaved but amplitude varying pulses (see FIG. 5d). Another approach is to use a nonlinear ramped code of amplitude varying pulses that can be tailored to the range profile of interest, for example using a quadratic varying amplitude variation or a "J" shaped amplitude profile. Ranging or distance calculation may be determined at the receiver as a pulse width where the "high" pulse state occurs where the receiver diode is activated, and a "low" pulse state occurs where the receiver diode is not activated. The length of the received pulse or pulses in the pulse train may thus, in some cases, be used to determine the range, as a related value to a count of the pulses in the same time period.

In an exemplary embodiment, the receivers in the array may be affixed to a stationary or movable frame, structure, assembly, object or the like, for example positioned in a symmetric or asymmetric manner about a central location on a circuit board. The receivers, in this case, are configured to point outward so as to receive signals from a wide angle, as shown in FIG. 1. Similarly, the array of receivers may be in a circle to determine a heading and azimuth angle from the emitter elements relative to a reference angle. Similarly the receivers may be positioned on a sphere to allow the receivers to determine spaced relation and angle relation coordinates in 3D using ranging, and heading and azimuth angles, as shown in FIG. 3.

In an exemplary embodiment, a system may be provided with a plurality of infrared emitters and receivers as a combination of a plurality of emitter devices positioned in 3D, which emitters are configured to transmit signals that send identifying signals, functional command signals, and signals characterizing their range, possibly among other signals. The signals are received by one or more receivers which may be a symmetric or asymmetric array either as a partially curved surface containing multiple receivers or as a complete circle or spherical configuration, as shown in FIG. 3. This figure illustrates a receiver configuration where receivers are arranged in a full circle in the plan view, and the heading angle is measured from zero to 360 degrees, but the elevation is only measured over a partial angle. Of course, the elevation angle detected may be increased with increasing "rings" of receivers on the spherical receiver surface 46.

Figure 4:
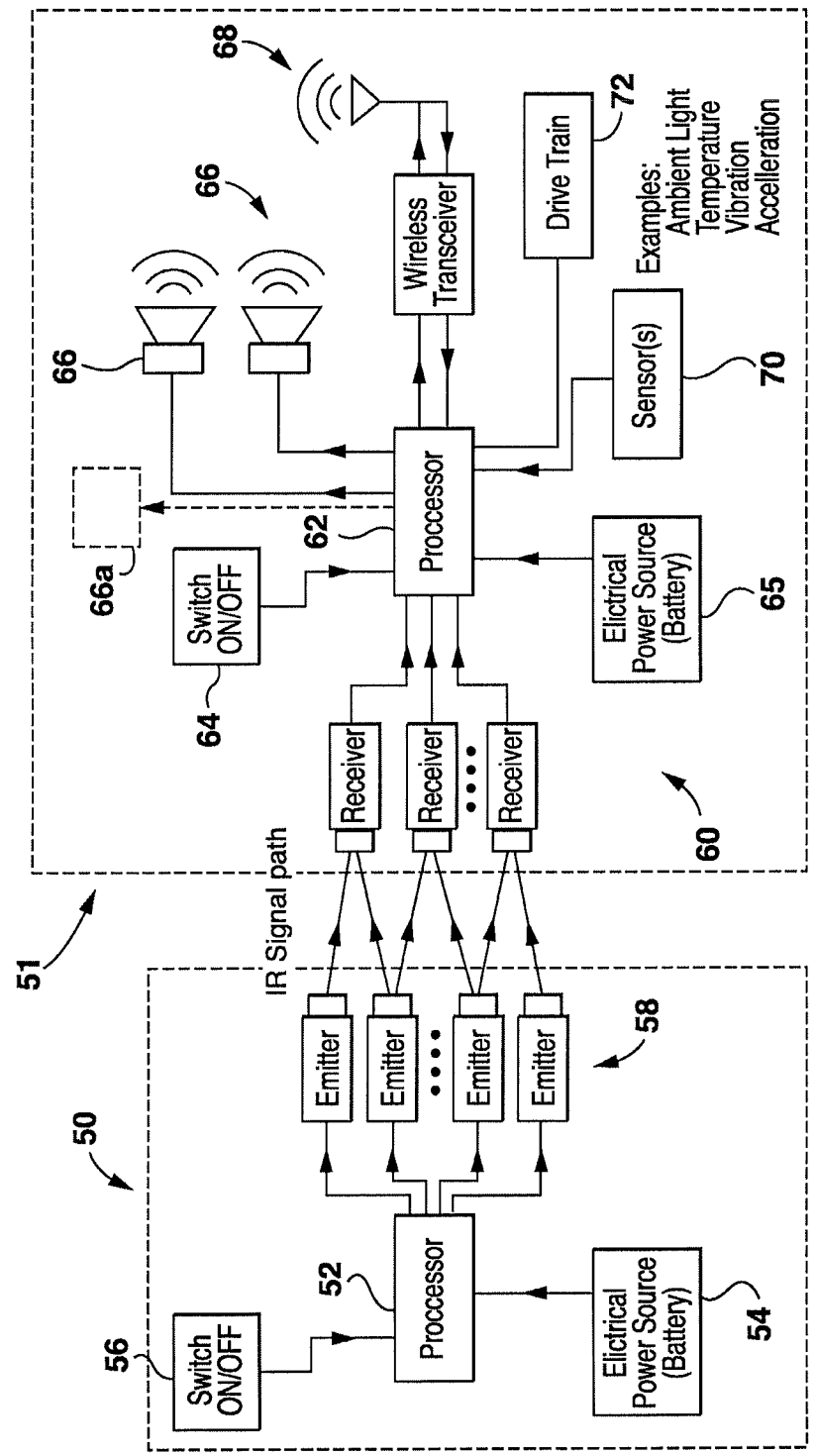
FIG. 4 is a schematic view showing features of the beacon device and locating device of FIGS. 1 to 3.

In an exemplary embodiment, as shown in FIG. 4, a beacon device 50 is located by a locating device 51. The beacon device 50 is operated by an emitter processor 52 and powered by an external power source 54 (such as a battery or the like), and switchable by a power/mode switch 56. The emitter processor 52 is configured to control the signaling of the emitter array 58 using a combination of data signaling and range bursts in the form of signals which propagate through the medium and are received substantially simultaneously to be processed by the receiver array 60 and specifically by receiver processor 62. The receiver array 60 is powered by a switch 64, and from an external power supply 65 (such as a battery or the like), and the receiver array 60 is automatically controlled by receiver processor 62 to operate configured autonomous functions, to communicate heading and range information internally or externally, that is to other functional units within the receiver or to other functional units within a larger system deploying range and heading detection activities. Output functions may be conveyed to output audio speakers 66 or external LED's, or using wireless devices 68 (Bluetooth, IRDA, WIFI, or the like), to output wireless data for external control purposes. The processor may also be responsive to various sensors 70 which may perform a variety of functions. Examples of such sensor functions are: the detection of ambient light, motion detection, temperature changes, vibration, and inertial sensing such as rotation or linear acceleration. The processor may also communicate with a drive train 72 to issue navigational commands in response to the detected angular location, and in some cases range, of the beacon 10.

The processor 62 may be configured to send audio instructions to a user carrying the locating device 51, such as in a cell phone, via the output audio speakers 66, as an output action, following the location of the beacon device 50. Such instructions may also be graphical instructions conveyed to the user by way of a display shown at 66a, by the use of directional arrows or a GPS-like-map interface or the like. Further, the audio instructions, via audio speakers 66, and/or graphical instructions by way of display 66a, may be delivered successively, in a GPS-like fashion, as the locating device moves relative to the beacon, or vice versa, as the locating device 51 updates the location of the beacon 50.

Figure 5D:
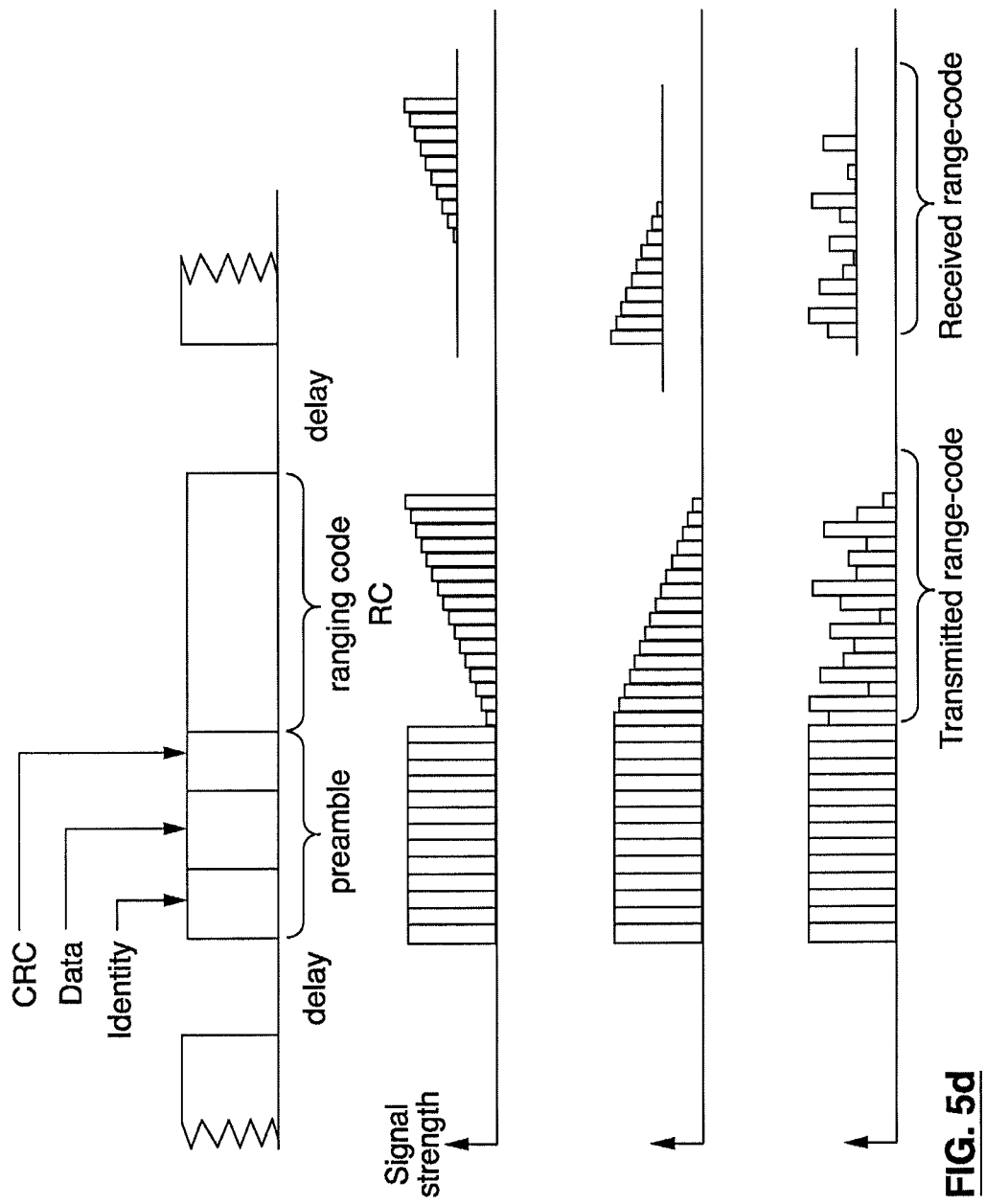
FIGS. 5*d* and 5*e* are schematic views of locating signal configurations.
Figure 5E:
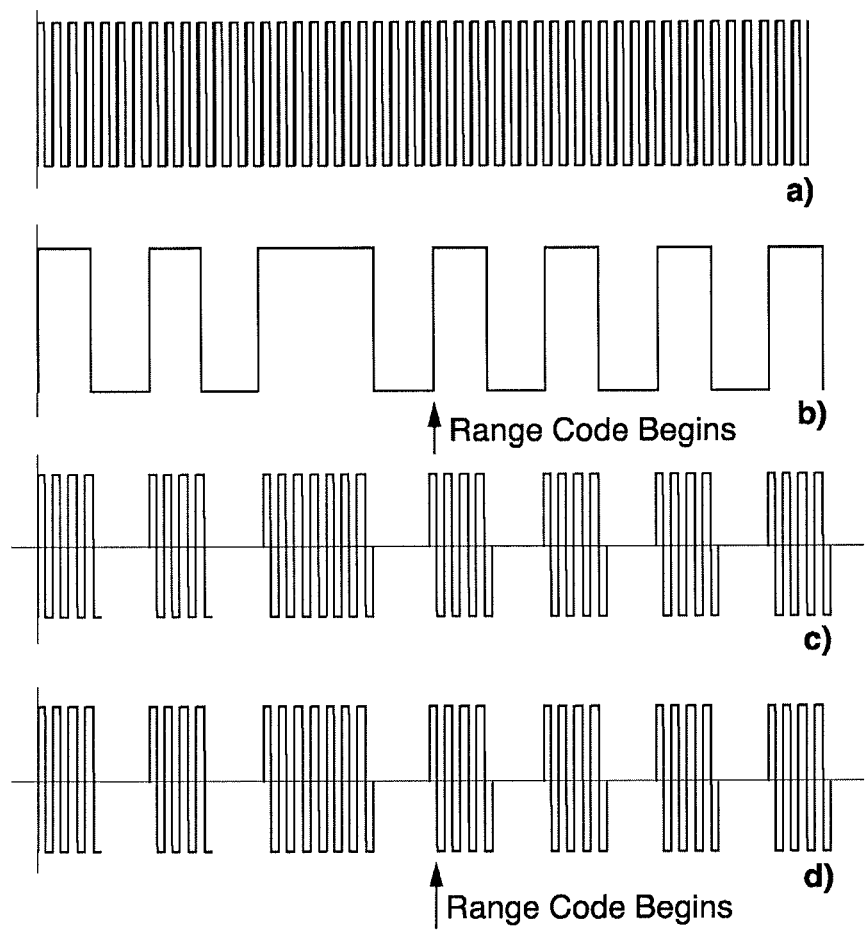

In some exemplary embodiments, multiple beacons may be configured to communicate identification data and ranging data to a receiving array using a communication protocol. The communication protocol may be a fixed structure preamble built into the communication signal structure followed or preceded by a ranging signal protocol as shown in FIGS. 5a to 5c, 5d and 5e. The communication protocol may also include a timing slotted protocol based on assigning beacons to a fixed time-slot based on a synchronized timing signal, as shown in FIGS. 5a to 5c. In FIG. 5a, a communication protocol can include an identifier, real-time data, and any means of encrypting the data, and using a scheme for checking accuracy (such as a CRC check-sum for example). Examples of protocols for communication with pulse burst ranging are: using a communication preamble followed by a ranging signal burst arranged in a time-slotted configuration (see FIG. 5b); and arranging the ranging signal bursts in an order that indicates a binary signal (see FIG. 5c). Another example may include no synchronization altogether and multiple beacons are randomly transmitting to the receiver array. Applicable communication protocols may also be deployed using a sequence of binary coded ranging bursts arranged suitably in an order that conveys a binary sequence reminiscent of the identification or data signal transmitted from a specific beacon, as shown in figures, which may be used in conjunction with known protocol stacks for Bluetooth, and other wireless applications.

In some exemplary embodiments, multiple beacons may be configured to transmit communication data (identification, mode data) and ranging signal bursts in an asynchronous manner. Data types can be device identification information and the mode of the game-play (such as tracking, following, and "fire" states, as an example). In this case, a receiver may be configured to acquire beacon data and determine if the data received is valid and not corrupted by another beacon transmitting overtop at the same time. If communicated data is corrupted then the receiver may be configured to reject the data packet and corresponding ranging burst. Such a scheme is similar to an internet wireless or wired protocol for accepting or rejecting data packets.

In some exemplary embodiments, a synchronizing signal may be deployed to control the timing slotting of communication signals to send binary coded data, as well as ranging signal bursts. The synchronizing signals may, for example, be a series of fixed time pulses transmitted with a fixed delay apart from each other. The origin of such timing pulses may be from various sources that involve one single clocking mechanism. For example, a GPS receiver may be used to receive atomic clock timed pulses from a GPS satellite, or a Bluetooth radio may send regularly timed pulses through the wireless network. In either case a beacon device may be configured with a synchronizing pulse receiver thereby to enable the beacon to emit the synchronous pulses at specific time-slots according to the received synchronizing pulse. Similarly, the receiver array may also be configured with a synchronizing pulse receiver to acquire the synchronous pulses to allocate the receiver time-slots for each transmitting beacon.

Some exemplary embodiments may deploy a wireless method of communicating data to and from the beacon. This approach may not necessarily require that ranging bursts be encoded using a timed method. However, the wireless data packets may be sent at approximately the same time or in near-synchronous timing to the range burst, to allow the receiver array to associate the received identification data packet with the received ranging burst. This approach, though more complex and costly, may justify such costs by enabling identification data to be sent independently from the ranging bursts, which may in some cases enable more efficient or improved management of asynchronous operation of the beacon/receiver communication protocol.

Some exemplary embodiments may configure the structure of the receiver array to calculate the range of the incoming beacon signal, as shown in FIG. 5d, the beacon may be configured to send out a burst of pulses that vary in signal strength, such as a ramped up signal, ramped down signal, or log-ramped signal or the like. Thus, the receiver array element may switch-on depending on the range. In this way, a train of received pulses may cause the receiver array element to switch-on for the duration of the train of pulses, where the first pulse in the train switches on the receiver array, and the last pulse is followed by the receiver array switching off.

An exemplary method for calculating the incoming range may be based on finding the maximum IR energy received for a specific range and heading as follows:

Range=MAX [E[i]], at A[k], for i=1, . . . ,N

For "i" being the index of each receiver element, and N is the total number of receiver elements, A[i] is the fixed angle of the receiver element "i".

E[i] is the IR pulse energy received at receiver element "i".

"k" is the receiver element that received the maximum energy, and A[k] is the angle of that receiver.

Figure 6:
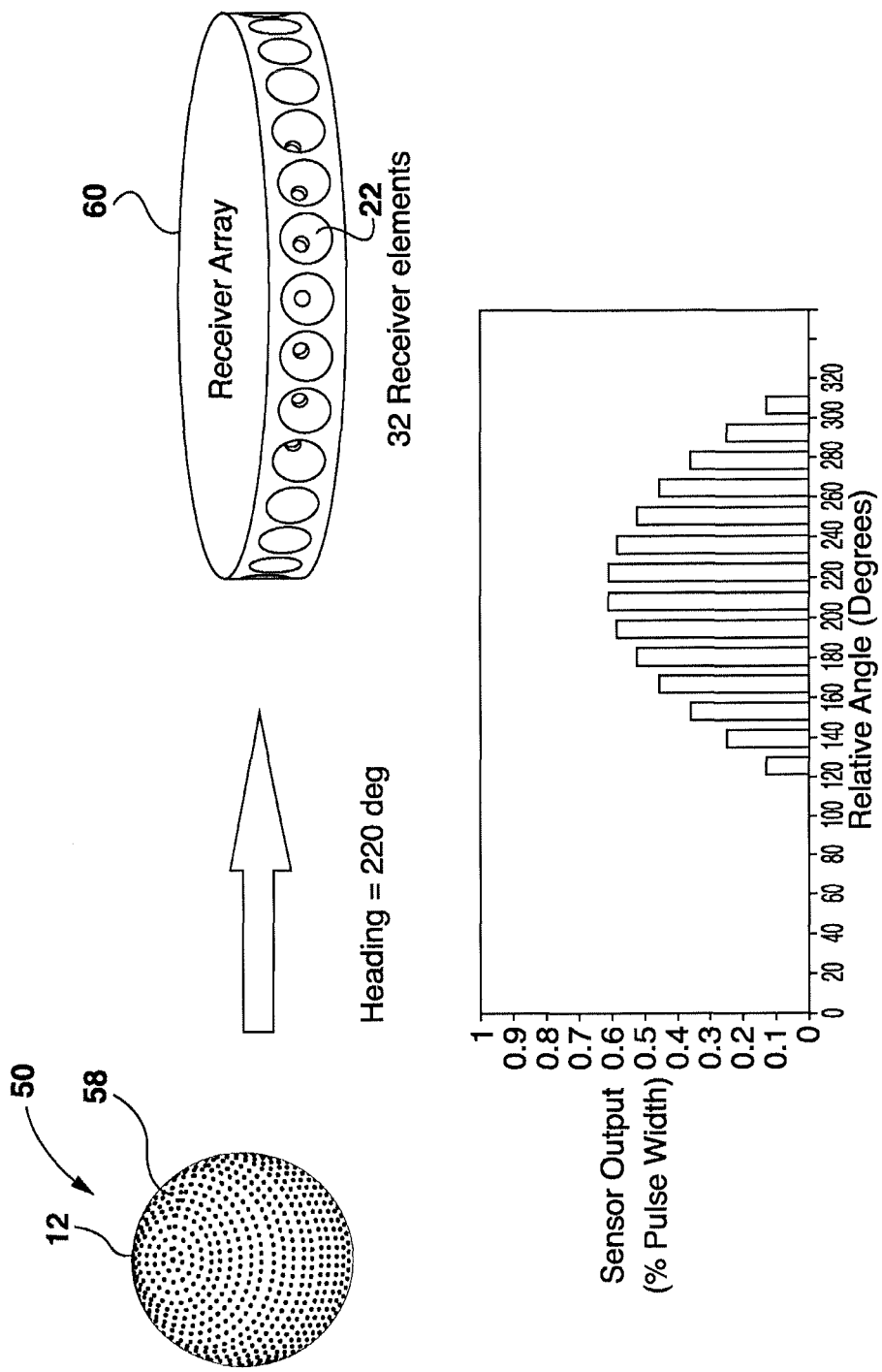
FIG. 6 is an operational schematic view of the beacon and locating devices of FIGS. 1 to 3.

This calculation for the range may be deployed in cases when a plurality of receivers are used for the receiver array, such as ten or more, as an example. An example is shown in FIG. 6, in which a number of receivers 22 are configured in a receiver array 60 to receive IR energy from a beacon device 50 with multiple emitters in an emitter array 58. In this example, a maximum range is a received pulse width of 60% of maximum power and the maximum energy is received at 220 deg. If a large number of receivers 22, such as 32 for example, are deployed, then a maximum range calculation may be based on a group of range energies that are normally distributed, where the maximum energy occurs at the maximum height of the normal curve, and this maximum occurs at an estimated heading angle of 220 deg (as shown in FIG. 6), which corresponds to a specific receiver.

Figure 7A:
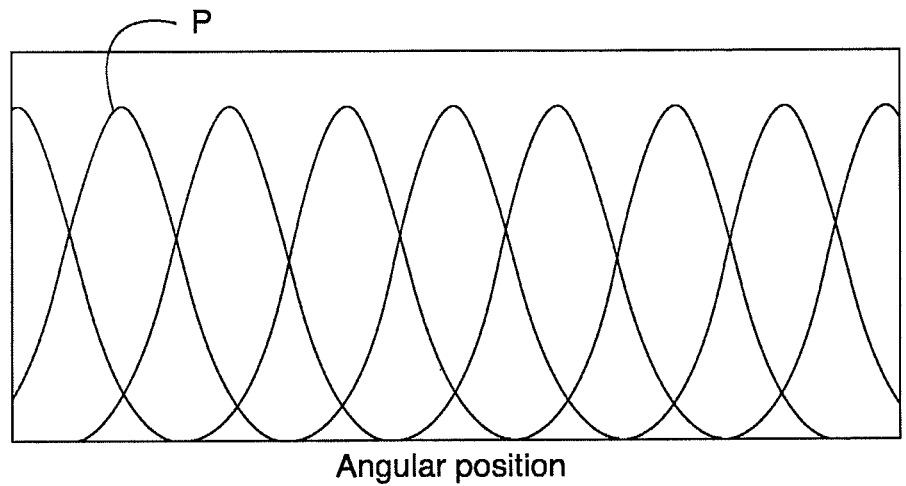
FIGS. 7a, 7b and 7c are schematic views of plots of angular position versus pulse count value for an example operation of a beacon and locating device of FIGS. 1 to 3.
Figure 7B:
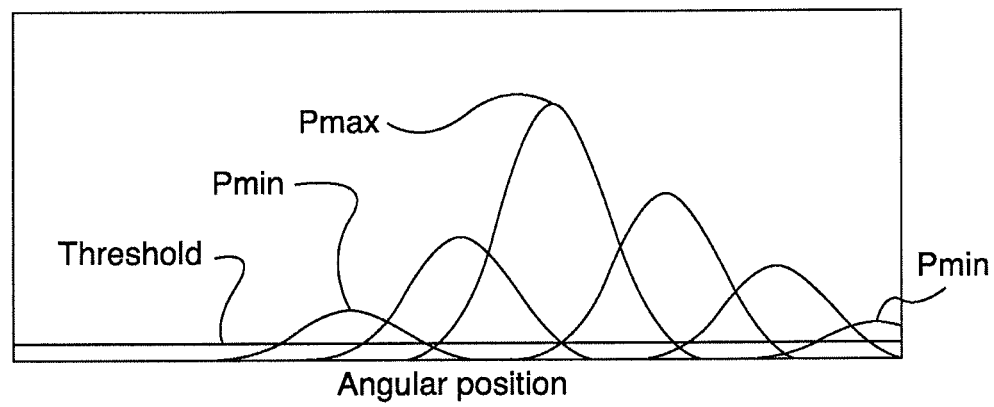
Figure 7C:
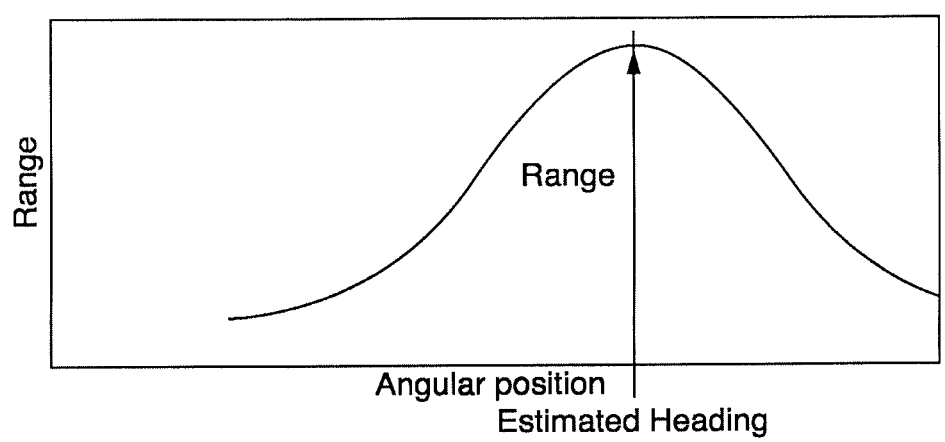

FIGS. 7a to 7c illustrate an example of determining or estimating angle and range with fewer receiver elements (in this case eight receivers are used). In this case, each peak P is the peak of an associated receiver, with eight peaks (the two end half-peaks being counted as one peak) shown in FIG. 7a. FIG. 7b shows the example of a Pmax signal received by the central receiver, and the outer two Pdim signals, all above the threshold as shown. FIG. 7c shows a curve or profile following a best fit analysis, indicating the estimated heading indicated by the location of the group, represented by arrow A, on the horizontal axis, with the range estimated by the height of the arrow A. In this case, arrow A does not align with a specific angular position of a receiver, but rather falls on a coordinate axis of angular points either adjacent one point for a receiver or between two points corresponding to adjacent receivers. In some exemplary embodiments, a receiver array may be configured to calculate heading (or bearing) angle of the incoming beacon signal, as shown in FIG. 3. Similarly, the array structure of the receiver array may be configured to calculate an elevation angle of the incoming beacon signal. An exemplary method for calculating the incoming beacon heading angle may be based on a calculation for heading using a weighted average as follows:

Heading=SUM [A[i]*E[i,j]]/SUM [E[i,j]],
for i=1, . . . ,N

Elevation=SUM [B[j]*E[i,j]]/SUM [E[i,j]],
for j=1, . . . ,M for (i,j) being the index of each receiver element, and N is the total number of heading receiver elements, and M is the total number of elevation receiver elements.

A[i] is the fixed heading angle of the receiver element "i".

B [j] is the fixed elevation angle of the receiver element "j".

E[i,j] is the IR pulse energy received at receiver element "(i,j)".

Applying the above to FIG. 3, the value of N for the number heading receiver elements equals the number of receiver elements in each ring, in this example sixteen, while the value of M for the elevation receiver elements equals the number of receiver elements in each vertical slice of the three rows, where each slice thus includes three receiver elements. In this case, then, each receiver element is a member of both the N and M groups.

Different approaches may be undertaken, involving formulae such as discrete interpolation methods, Gaussian curves, or the like may be used to estimate the maximum likelihood heading and elevation angles. They may be similar to a weighted average, and are thus included as a representation of this estimate.

Figure 8:
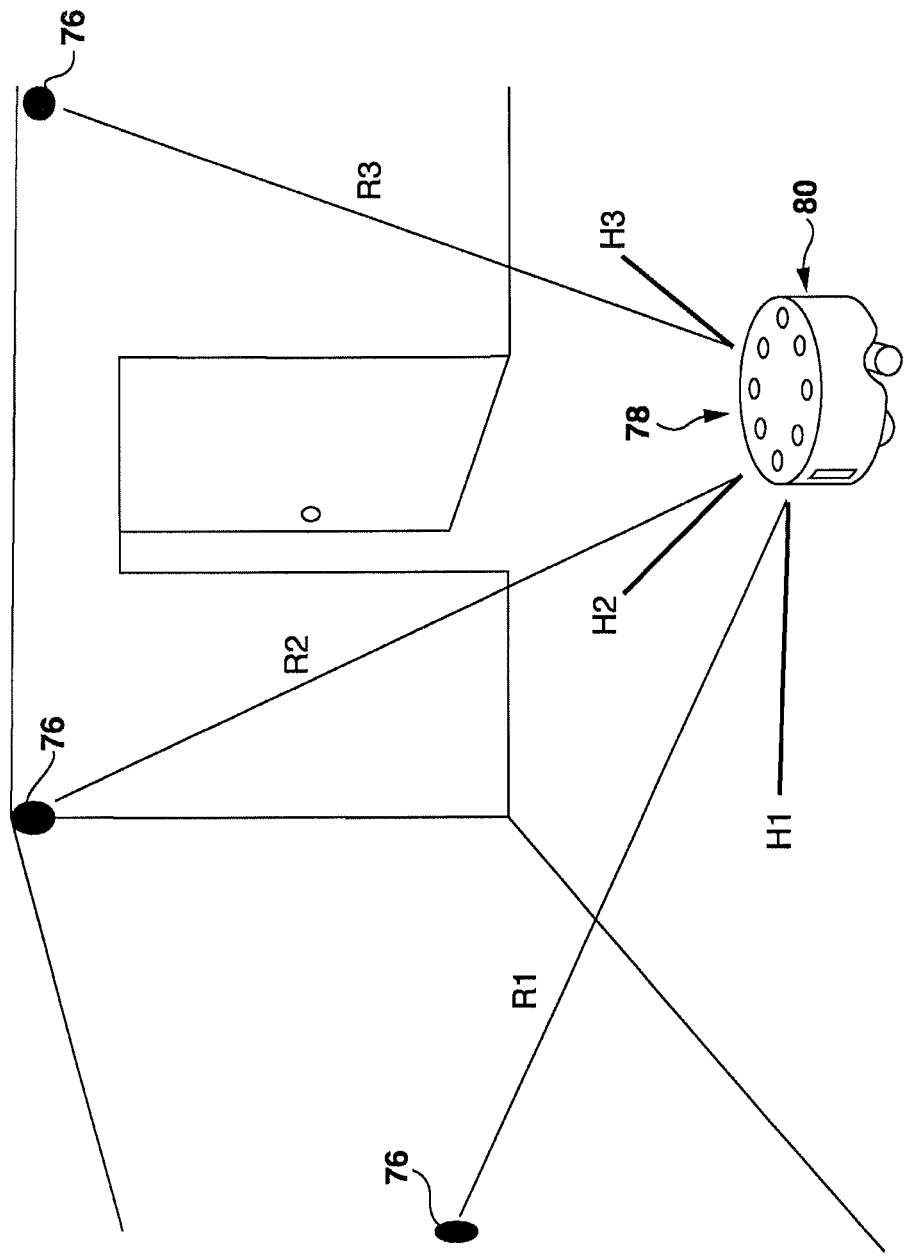
FIG. 8 is a perspective schematic view of an operational configuration for a method of using beacons to triangulate the position of a receiver array on a robotic device.

In some exemplary embodiments, as shown in FIG. 8, a single beacon or multiple beacons 76 may be placed at fixed locations with emitters mounted to beam signals in an angled manner away from the mounting surface. For example, FIG. 8 shows a room with three beacons 76 mounted on the wall ceiling or corners of the room with emitting elements covering a specific angle of illumination. With a single or multiple receiver array 78 located in the room and inside the illumination area of the multiple beacons 76, the receiver array 78 may be positioned with one or more beacons 76 actively transmitting data signals and ranging bursts. FIG. 8 illustrates that the receiver array 78 may process ranging data as R1, R2, R3, and heading data as H1, H2, H3 all which can be used to position, for example, a robot 80 in real-time.

Figure 9:
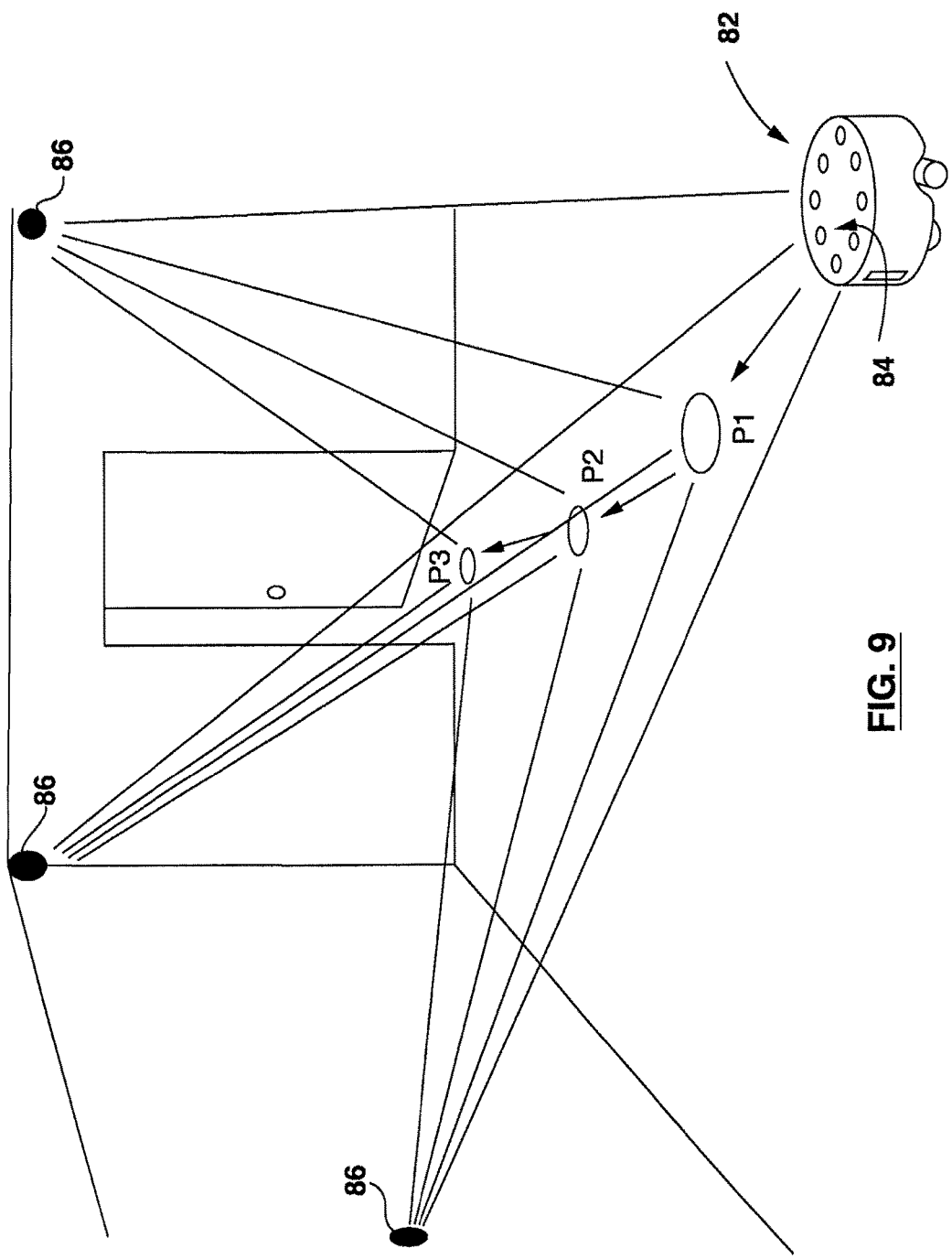
FIG. 9 is a perspective schematic view of an operational configuration for a method of plotting waypoints and using heading angles to plot a guided path for a robot.

It some exemplary embodiments, as shown in FIG. 9, a receiver array based receiver vehicle 82 may be configured to determine a path to a programmed waypoint. By positioning a receiver array 84 with an angle and a range from the beacons 86, the receiver array processor may plot a waypoint P1, P2, P3 based on an existing position point as reference. Hence a sequence of additional waypoints may be plotted and sent to a guidance and control subsystem in the receiver vehicle 82 to plot movement to the plotted waypoint. Exemplary embodiments may be applied to robotics where directions are made to move the robot along a series of waypoints and verified using the beacon/receiver array approach to position the robot in time or real-time, as shown in FIG. 9.

In some exemplary embodiments, guidance and control algorithms may be deployed to plot waypoints and allow for the accuracy improvement of a path along a waypoint. Waypoints to be determined in this case may involve the triangulation of range values, and add the estimated position based on heading and elevation angles also estimated using the receiver array. As shown in FIG. 10, examples of such accuracy improvement may allow for the precise docking of a robot 88 to a docking station 90. This may be accomplished with relatively simple electronics involving two beacons 92 and a single receiver array 94, as shown in FIG. 10.

While FIG. 1 shows beacon device at 10 at with at least one, in this case a plurality of emitters 12 which are distributed along an emitter surface 14, with each emitter 12 configured to emit at least one locating signal 16 along a unique axis 18, other exemplary embodiments may be deployed in which a plurality of emitters emit at least one locating signal along, for example, parallel axes. This may be particularly beneficial with each emitter being nonetheless uniquely identifiable.

Exemplary embodiments may be implemented, for example, for use as single or multiple beacons combined with one or more receiver arrays for any of the following, among other possible applications:

Target tracking for a fixed camera system for zooming/focus;
Target tracking for a mobile camera system for orienting/following;
Target tracking for toy applications;
Target tracking for sports applications (golf, baseball, training, etc.);
Hand-held devices that do 6DOF position and orientation, for 3D gaming as an example;
Tracking and positioning of badges and other transmitters for real-time people or asset tracking; and
Docking and positioning of robots.

The present disclosure describes what are considered to be practical exemplary embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes may readily occur to those skilled in the art, it is not desired to limit the invention to the exact construction and operation shown and described, and accordingly, all suitable modifications and equivalents may be resorted to, falling within the scope of the invention.

While a device or assembly and an accompanying method have been described for what are presently considered the exemplary embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A system for locating a near infra-red emitter, comprising:
a plurality of spaced receivers configured to receive one or more near infra-red signals, each of the receivers having an angular position coordinate value, stored in memory, associated with a designated angle of the receiver relative to a reference axis;
each receiver configured to receive at least one locating near infra-red signal from the emitter, the locating signal including, at least in part, a plurality of pulses in at least one train of pulses;
at least one locator processor, in communication with the spaced receivers, the at least one locator processor configured to:
process the at least one near infra-red locating signal received at each receiver in a group of receivers in respective locating signal-receiving positions, to form a pulse count value in relation to a count of pulses above a pulse strength threshold;
form a pulse count profile whose coordinates include the pulse count values and corresponding angular locations; and
attribute a designated angular position coordinate value, corresponding to a maximum pulse count value in the pulse count profile, as a location value representative of at least the heading of the emitter.

2. A system as defined in claim 1, wherein the pulses in the train of pulses vary in pulse strength from one pulse to another, the locator processor configured to attribute a range value to the locating signal emitter, according to the maximum pulse count value.

3. A system as defined in claim 2, the locator processor configured to attribute at least the heading value to an emitter identifier to form a first set of emitter locating coordinates, and to store the first set in memory.

4. A system as defined in claim 3, wherein first set includes the range value.

5. A system as defined in claim 4, the locator processor configured, for at least a second clock increment, to form a second set of emitter locating coordinates, and to store the second set in memory.

6. A system as defined in claim 5, the locator processor configured to initiate an action in relation to the first and or second sets of coordinates.

7. A system as defined in claim 6, wherein the action includes deploying a drive train.

8. A system as defined in claim 7, wherein the action is an audio or graphical message.

9. A system as defined in claim 8, the local processor configured to select the action according to a received instruction.

10. A system as defined in claim 1, the locator processor configured to access the emitter identifier from the emitter or from memory.

11. A system as defined in claim 1, wherein the locator processor is configured to calculate the angular position value according to:

$$\text{Angular Position Value} = \text{SUM}\,[A[i]*E[i]]/\text{SUM}\,[E[i]],$$

for $i=1, \ldots, N$
where "i" is the index of each receiver;
N is the total number of receivers;
A[i] is the angular position value of the receiver "i"; and
E[i] is the pulse count value of the receiver "i".

12. A system as defined in claim 1, wherein the designated angular position value corresponds to an angular position value of a receiver registering the maximum pulse count value.

13. A system as defined in claim 12, wherein the designated angular position value is adjacent an angular position value of at least one receiver.

14. A system as defined in claim 1, further comprising at least one emitter processor, in communication with the emitter, and configured to enable the emitter to emit the locating signal with or without the emitter identifier.

15. A system as defined in claim 14, the emitter processor configured to enable the emitter to emit the locating signal intermittently, continuously or following receipt of an interrogatory or synchronizing signal.

16. A system as defined in claim 14, the emitter processor further configured to enable the emitter to emit the locating signal at a carrier frequency selected from the group consisting of: far infrared, visible, ultra-violet, high frequency radio, ultra-wideband radio, and ultrasonic.

17. A system as defined in claim 14, further comprising a plurality of objects including (i) at least one first object comprising the at least one emitter and at least one emitter processor, and (ii) at least one second object comprising the plurality of receivers and at least one locator processor.

18. An assembly as defined in claim 17, the first and second objects being selected from the group comprising:
   i) motorized objects capable of moving relative to one another;
   ii) motorized object and one or more stationary object;
   iii) motorized toys capable of moving relative to one another;
   iv) a movable device and a reference unit therefor;
   v) a robotic device and a reference unit therefor;
   vi) a robotic vacuum and a reference unit therefor;
   vii) a camera, cell phone, vehicle, appliance and/or accessory, and a reference unit therefor;
   viii) a movable sport object from any one of archery, model aircraft, badminton, football, baseball, volleyball, rugby, tennis, basketball, golf, hockey, cricket, squash, tennis;
   ix) a weapon and/or a projectile reference unit therefor;
   x) a drone and a reference unit therefor;
   xi) a wearable identity tag and a reference unit therefor; and
   xii) an accessory to any one or more of i) to xi).

19. A system as defined in claim 1, further comprising a beacon with a body defining one or more surface regions, further comprising a plurality of the emitters located on said one or more surface regions.

20. A system as defined in claim 1, wherein the receivers are aligned, at least in part, along a curve relative to the reference axis.

21. A system as defined in claim 20, wherein the receivers are organized in adjacent rows, wherein the receivers in each row receive locating signals at different angular positions corresponding to different heading angle values, at a common designated elevation angle, of the emitter.

22. A system as defined in claim 21, wherein the receivers are organized in adjacent rows, wherein the receivers in each row receive locating signals at different angular positions corresponding to different heading angle values, at a common designated elevation angle, of the emitter, according to:

Heading=SUM $[A[i]*E[i,j]]$/SUM $[E[i,j]]$, for $i=1,\ldots,N$

Elevation=SUM $[B[j]*E[i,j]]$/SUM $[E[i,j]]$, for $j=1,\ldots,M$ for (i,j) being the index of each receiver, and N is the total number of heading receiver elements, and M is the total number of elevation receiver elements;
A[i] is the fixed heading angle of the receiver element "i";
B[j] is the fixed elevation angle of the receiver element "j";
E[i,j] is the IR pulse energy received at receiver element "(i,j)".

23. A method of interacting a target object with a tracking object, comprising:
   providing a tracking object with an array of spaced receivers to be positioned relative to a tracking location, each of the receivers having an angular position value associated with a designated angle of the receiver relative to a reference axis, and at least one action output to initiate an action in relation to the target object, each receiver configured to receive at least one near infra-red signal;
   enabling the receivers to receive at least one near infra-red locating signal from an emitter onboard a target object, the locating signal including, at least in part, a plurality of pulses in a train of pulses;
   assembling pulse count values, each associated with a count of pulses received by those receivers oriented in signal-receiving positions relative to the target object;
   associating the angular positions of the signal receiving receivers to their corresponding pulse count values to identify an angular position corresponding to a maximum pulse count value, as an angular target location of the target object; and
   enabling the action output, in relation to the angular target location.

24. A method as defined in claim 23, wherein the pulses in the train of pulses vary in strength from one pulse to another, further comprising identifying a range of the target object relative the reference axis, according to the maximum pulse value.

25. A method as defined in claim 23, wherein the action output is operatively coupled to a drive train for displacing the tracking object.

26. A method as defined in claim 23, further comprising:
   a. for a first time period, mapping a first waypoint relative to the angular location; and
   b. enabling the action output includes enabling the drive train to displace the tracking object toward the first waypoint.

27. A method as defined in claim 26, further comprising:
   c. for a second time period, identifying an updated angular position of the target object;
   d. mapping a second waypoint relative to the updated annular position; and
   e. enabling the drive train to displace the tracking object toward the second waypoint.

28. A method as defined in claim 27, wherein the mapping includes accessing a stored geographical descriptor corresponding to an interim value according to one of the waypoints, and correcting the interim value according to the angular location to form the waypoint.

* * * * *